United States Patent
Hedayat et al.

(10) Patent No.: US 12,004,198 B2
(45) Date of Patent: Jun. 4, 2024

(54) AUTONOMOUS LOW LATENCY COMMUNICATION

(71) Applicant: InterDigital Patent Holdings, Inc., Wilmington, DE (US)

(72) Inventors: Ahmad Reza Hedayat, Aliso Viejo, CA (US); Mahmoud Taherzadeh Boroujeni, San Diego, CA (US); Oghenekome Oteri, San Diego, CA (US); Shahrokh Nayeb Nazar, San Diego, CA (US); Erdem Bala, East Meadow, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 522 days.

(21) Appl. No.: 17/279,630

(22) PCT Filed: Oct. 3, 2019

(86) PCT No.: PCT/US2019/054379
§ 371 (c)(1),
(2) Date: Mar. 25, 2021

(87) PCT Pub. No.: WO2020/072708
PCT Pub. Date: Apr. 9, 2020

(65) Prior Publication Data
US 2021/0392618 A1    Dec. 16, 2021

Related U.S. Application Data

(60) Provisional application No. 62/886,567, filed on Aug. 14, 2019, provisional application No. 62/790,167, (Continued)

(51) Int. Cl.
*H04W 72/566* (2023.01)
*H04W 72/20* (2023.01)
(Continued)

(52) U.S. Cl.
CPC ........... *H04W 72/30* (2023.01); *H04W 72/20* (2023.01)

(58) Field of Classification Search
CPC ...... H04W 72/30; H04W 72/20; H04W 92/18
See application file for complete search history.

(56) References Cited

U.S. PATENT DOCUMENTS 10,764,805 B2 * 9/2020 Dou ................... H04W 36/30
11,864,023 B2 * 1/2024 Yi ..................... H04W 28/0278
(Continued)

FOREIGN PATENT DOCUMENTS

| CN | 102907169 A | 1/2013 |
|---|---|---|
| CN | 107211297 A | 9/2017 |

(Continued)

OTHER PUBLICATIONS

3GPP TSG RAN WG1 Meeting#81, R1-153120 Title: Coexistance EvalutionResults for DI-only LAA and Wi-FI with RTS/CTS (Year: 2015).*

(Continued)

*Primary Examiner* — Diane L Lo
*Assistant Examiner* — Abusayeed M Haque
(74) *Attorney, Agent, or Firm* — CONDO ROCCIA KOPTIW LLP

(57) ABSTRACT

A relay wireless transmit/receive unit (WTRU) may receive a data transmission from a target WTRU. The data transmission from the target WTRU may be or may include an implicit indication that the target WTRU is unable to listen for a message directed to the target WTRU. The message directed to the target WTRU may be a broadcast preemption message (BPM) and may be transmitted from a source WTRU. Based on the reception of the data transmission from the target WTRU, the relay WTRU may determine that the target WTRU is unable to listen for the BPM. Based on the determination, the relay WTRU may monitor for the BPM. The relay WTRU may receive and decode the BPM. The relay WTRU may determine whether to relay the BPM (Continued)

in a message, such as a broadcast relay message (BRM). The relay WTRU may transmit the BRM to the target WTRU.

20 Claims, 14 Drawing Sheets

Related U.S. Application Data filed on Jan. 9, 2019, provisional application No. 62/741,862, filed on Oct. 5, 2018.

(51) Int. Cl.
*H04W 72/30* (2023.01)
*H04W 92/18* (2009.01)

(56) References Cited

U.S. PATENT DOCUMENTS

| | | | |
|---|---|---|---|
| 11,864,036 B2 * | 1/2024 | Cirik | ............ H04L 5/0048 |
| 2007/0123170 A1 * | 5/2007 | Ozer | ............ H04W 16/14 455/114.2 |
| 2012/0300692 A1 | 11/2012 | Sfar et al. | |
| 2017/0041951 A1 * | 2/2017 | Yin | ............ H04W 74/08 |
| 2017/0215039 A1 * | 7/2017 | Amizur | ............ H04W 4/33 |
| 2023/0354211 A1 * | 11/2023 | Chae | ............ H04W 52/242 |
| 2023/0389002 A1 * | 11/2023 | Hui | ............ H04L 5/0064 |

FOREIGN PATENT DOCUMENTS

| | | | | |
|---|---|---|---|---|
| WO | WO-2004091155 A1 * | 10/2004 | | ............ H04B 7/155 |
| WO | 2016/022849 A1 | 2/2016 | | |
| WO | 2016/073984 A2 | 5/2016 | | |

OTHER PUBLICATIONS

3rd Generation Partnership Project (3GPP), R1-1810283, "Discussion on Sidelink Resource Allocation Mechanism", LG Electronics, 3GPP TSG RAN WG1 Meeting #94bis, Chengdu, China, Oct. 8-12, 2018, pp. 1-7.

* cited by examiner

AUTONOMOUS LOW LATENCY COMMUNICATION

CROSS REFERENCE

This application is the National Stage Entry under 35 U.S.C. § 371 of Patent Cooperation Treaty Application No. PCT/US2019/054379, filed Oct. 3, 2019, which claims the benefit of U.S. Provisional Application No. 62/741,862, filed on Oct. 5, 2018, U.S. Provisional Application No. 62/790,167, filed on Jan. 9, 2019, and U.S. Provisional Application No. 62/886,567, filed on Aug. 14, 2019, the contents of which are incorporated by reference herein.

BACKGROUND

A wireless communication system may facilitate the transmission and reception of data between devices and/or network components. The transmission and reception of data may be associated with various wireless applications, such as voice communication, multimedia distribution, machine-type communication (MTC), public safety communication, vehicular communication, and the like. Thus, the wireless communication system may employ technologies intended to facilitate the wireless exchange of data in accordance with one or more applications. For example, the wireless communication system may employ technologies intended to reduce a wireless device's battery consumption, which may be useful for MTC applications. Wireless applications may use other technologies, such as those for supporting ultra-reliable low latency communication (URLLC).

SUMMARY

Systems, methods, and instrumentalities for a wireless transmit/receive unit (WTRU), such as a relay WTRU, receiving a data transmission from other WTRU(s), such as a target WTRU may be described herein. The data transmission from the target WTRU may be or may include an implicit indication that the target WTRU is unable to listen for a message directed to the target WTRU. The message directed to the target WTRU may be or may include a broadcast preemption message (BPM). For example, the BPM directed to the target WTRU may stop the target WTRU to transmit on a resource. The BPM may be transmitted from a WTRU, such as a source WTRU.

Based on the reception of the data transmission from the target WTRU, the relay WTRU may determine that the target WTRU is unable to listen for the message directed to the target WTRU.

The relay WTRU may monitor for the message directed to the target WTRU (e.g., the BPM) based on the determination that the target WTRU is unable to listen for the message directed to the target WTRU.

The relay WTRU may receive the message directed to the target WTRU (e.g., the BPM).

The relay WTRU may decode the message directed to the target WTRU (e.g., the BPM) and may determine whether to relay the message directed to the target WTRU in a message, such as a broadcast relay message (BRM). For example, the relay WTRU may decode the message (e.g., the BPM) and determine a number of times that the message (e.g., the BPM) has been relayed, a time stamp indicative of when the message (e.g., the BPM) has been transmitted from a third WTRU, a distance between the third WTRU and the first WTRU, and/or the like.

In examples, based on the determination, the relay WTRU may transmit the message directed to the target WTRU in the message, such as the BRM. The relay message may be or may include information about the number of times that the message (e.g., the BPM) has been relayed, the time stamp associated with when the message (e.g., the BPM) has been transmitted from the third WTRU, the distance between the third WTRU and the first WTRU, and/or the like.

In examples, based on the determination, the relay WTRU may stop transmitting the message, such as the BRM, to the target WTRU. For example, if the relay WTRU determines that a number of times that the message directed to the target WTRU has been relayed exceeds a preconfigured counter threshold, a time stamp indicative of when the message directed to the target WTRU has been transmitted from a WTRU (e.g., a source WTRU) exceeds a preconfigured time threshold, a distance between the source WTRU and the relay WTRU exceed a preconfigured distance threshold, and/or the like, the relay WTRU may stop transmitting the BRM to the target WTRU.

If the relay WTRU determines to relay the message directed to the target WTRU (e.g., the BPM), the relay WTRU may transmit the message, such as the BRM, to the target WTRU.

If the message directed to the target WTRU has not been received, the relay WTRU may decode the data transmission from the target WTRU.

Systems, methods, and instrumentalities facilitating ultra-reliable low latency communication (URLLC) may be provided. A WTRU may be configured for grant free (GF) transmissions, which may utilize resources that are shared with other WTRUs. The GF transmissions may include one or more attribute(s), which may be determined and/or adjusted by the WTRU. The WTRU may be configured to pre-empt the transmissions of one or more of the other WTRUs based on certain criteria, such as priority and/or latency requirements. Pre-emption may be indicated with a pre-emption indicator (PRI). Pre-emption may be single stage or multiple stage. The WTRU may pre-empt the other WTRUs by signaling the priority and/or latency requirements of its transmission(s) and/or by transmitting an interruption signal. The WTRU's ability to pre-empt other WTRUs on the shared resources may depend on the priority of its transmission(s). The WTRU may transmit control information related to its transmission(s) and employ mechanisms for avoiding collisions with other WTRUs on the shared resources.

A target WTRU may delegate the act of listening to preemption message(s) (e.g., preemption message(s) from a network or a source WTRU) to a relay WTRU. For example, the target WTRU may delegate listening to the preemption messages when the target WTRU may be unable to listen. The target WTRU may delegate listening to the preemption messages to the relay WTRU explicitly or implicitly.

Figure 1A:
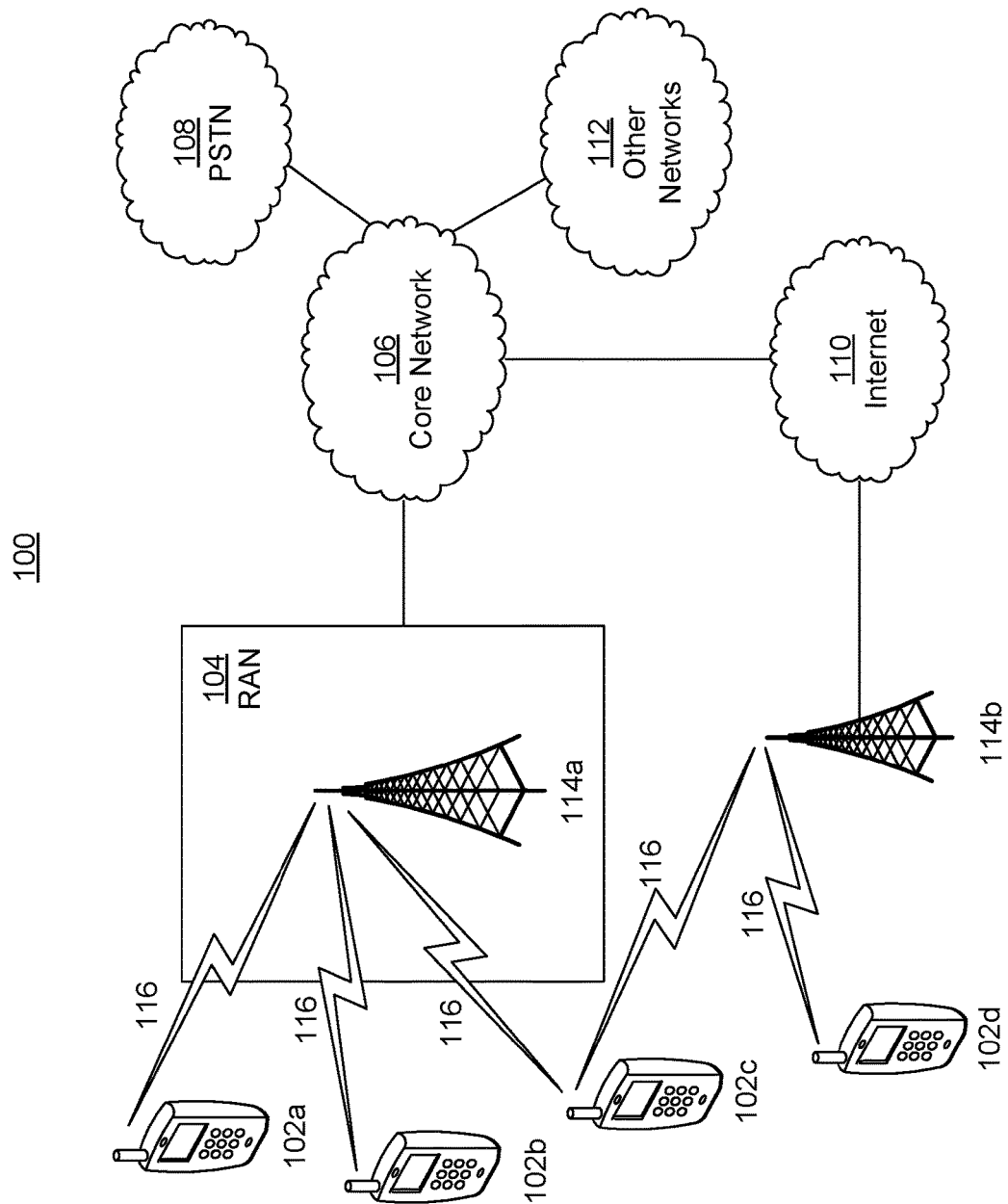
FIG. 1A is a system diagram illustrating an example communications system in which one or more disclosed embodiments may be implemented.

that may be used within the communications system illustrated in FIG. 1A according to an embodiment.

Figure 1B:
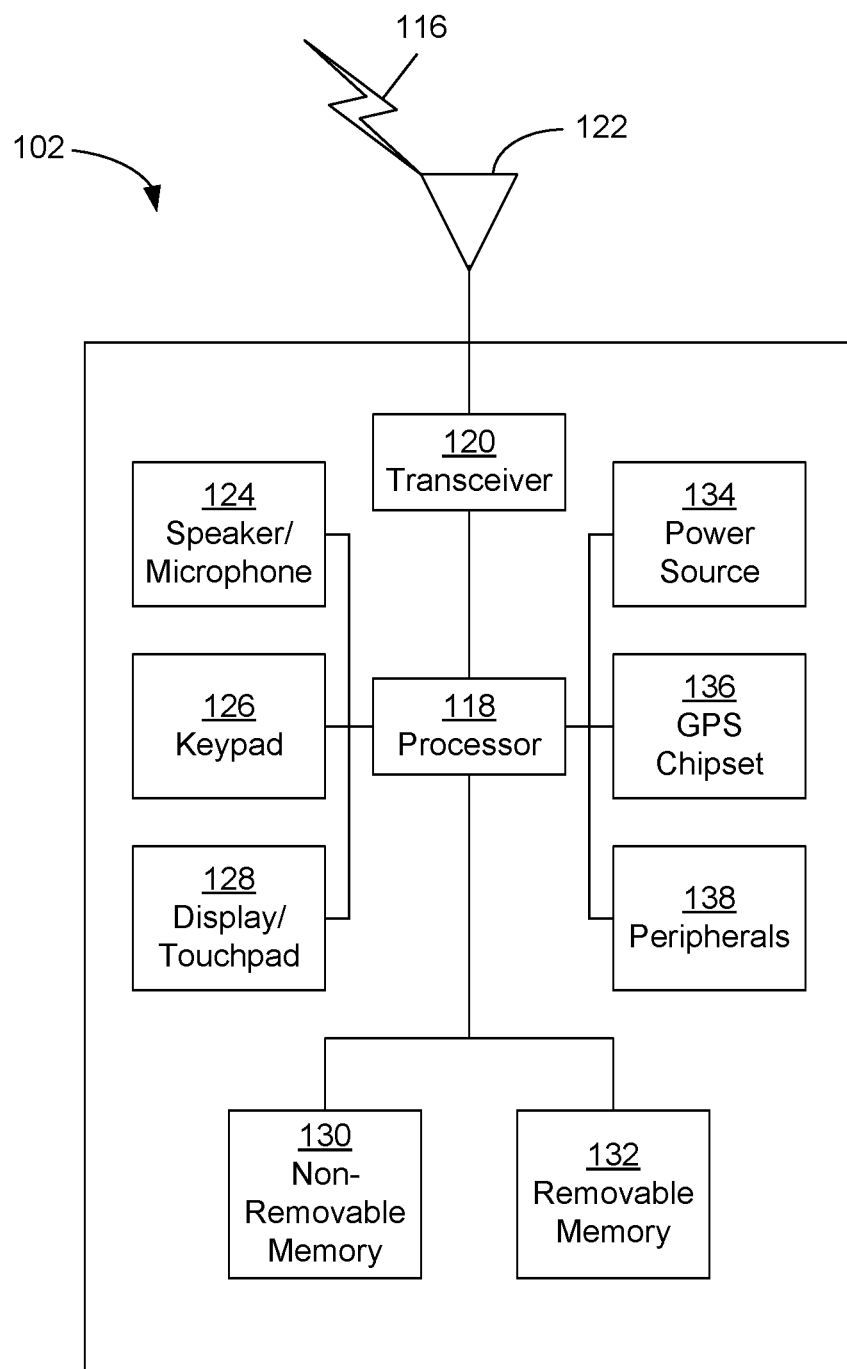
FIG. 1B is a system diagram illustrating an example wireless transmit/receive unit (WTRU) that may be used within the communications system illustrated in FIG. 1A according to an embodiment.
Figure 1C:
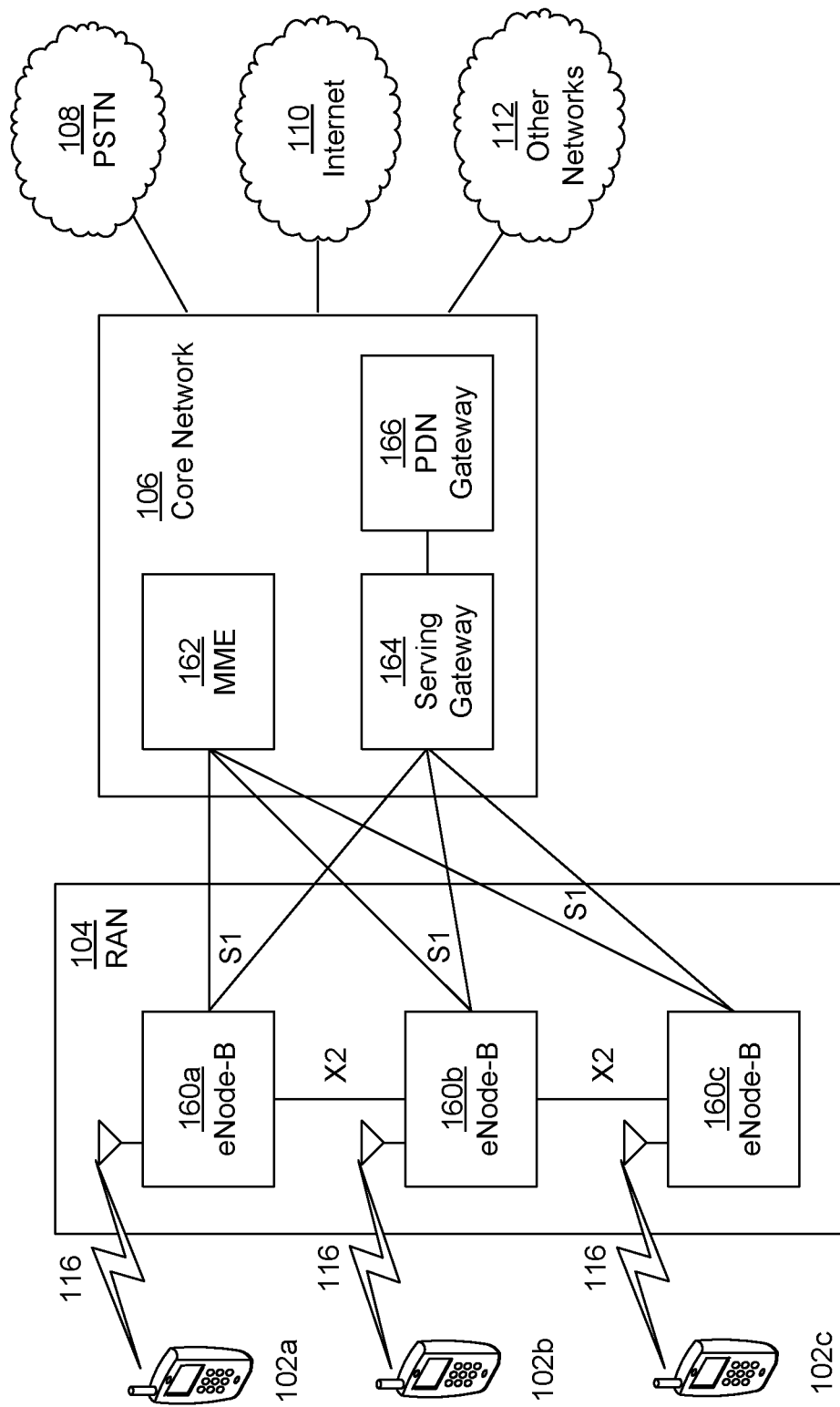
FIG. 1C is a system diagram illustrating an example radio access network (RAN) and an example core network (CN)
Figure 1D:
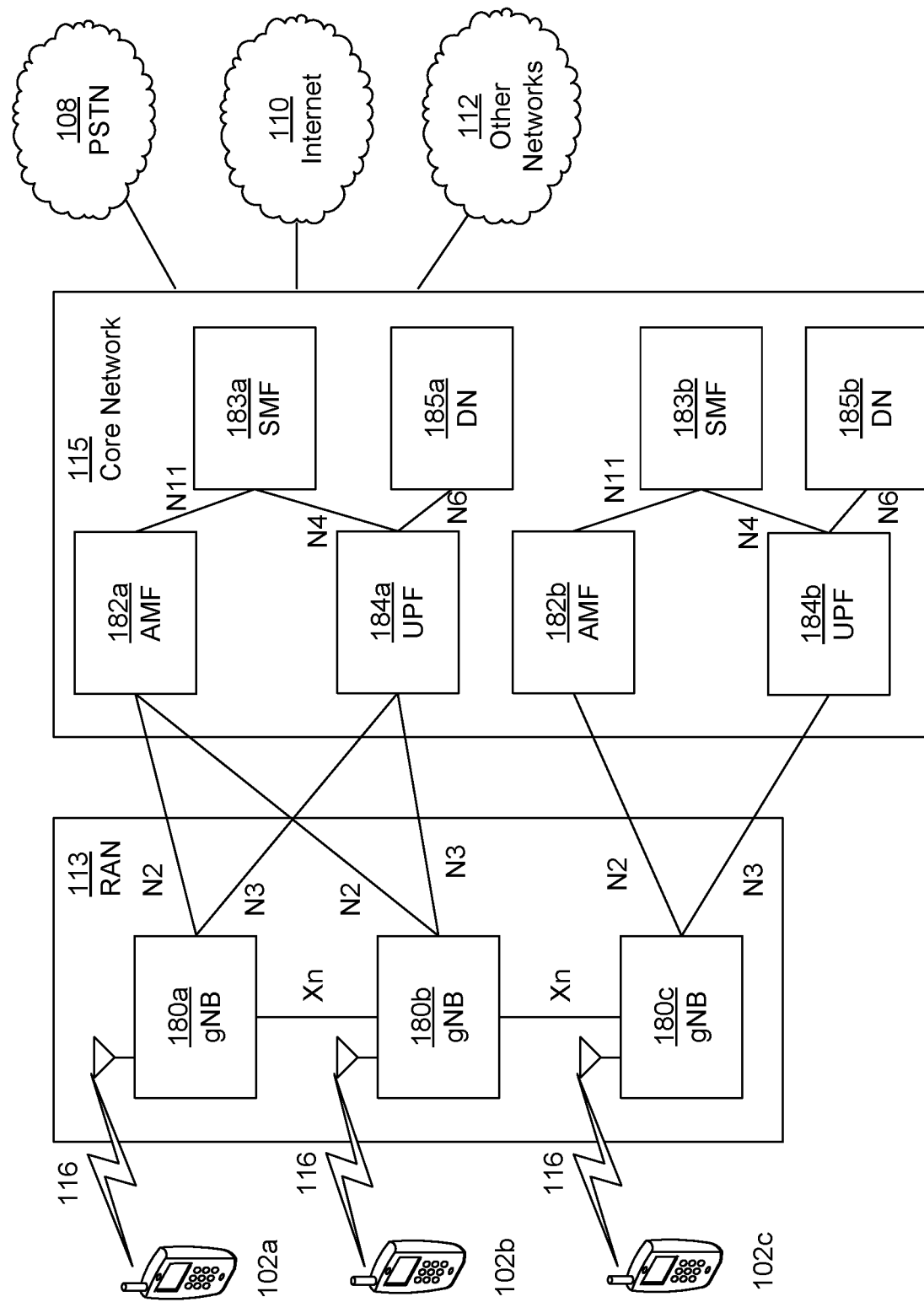

FIG. 1D is a system diagram illustrating a further example RAN and a further example CN that may be used within the communications system illustrated in FIG. 1A according to an embodiment.

Figure 2:
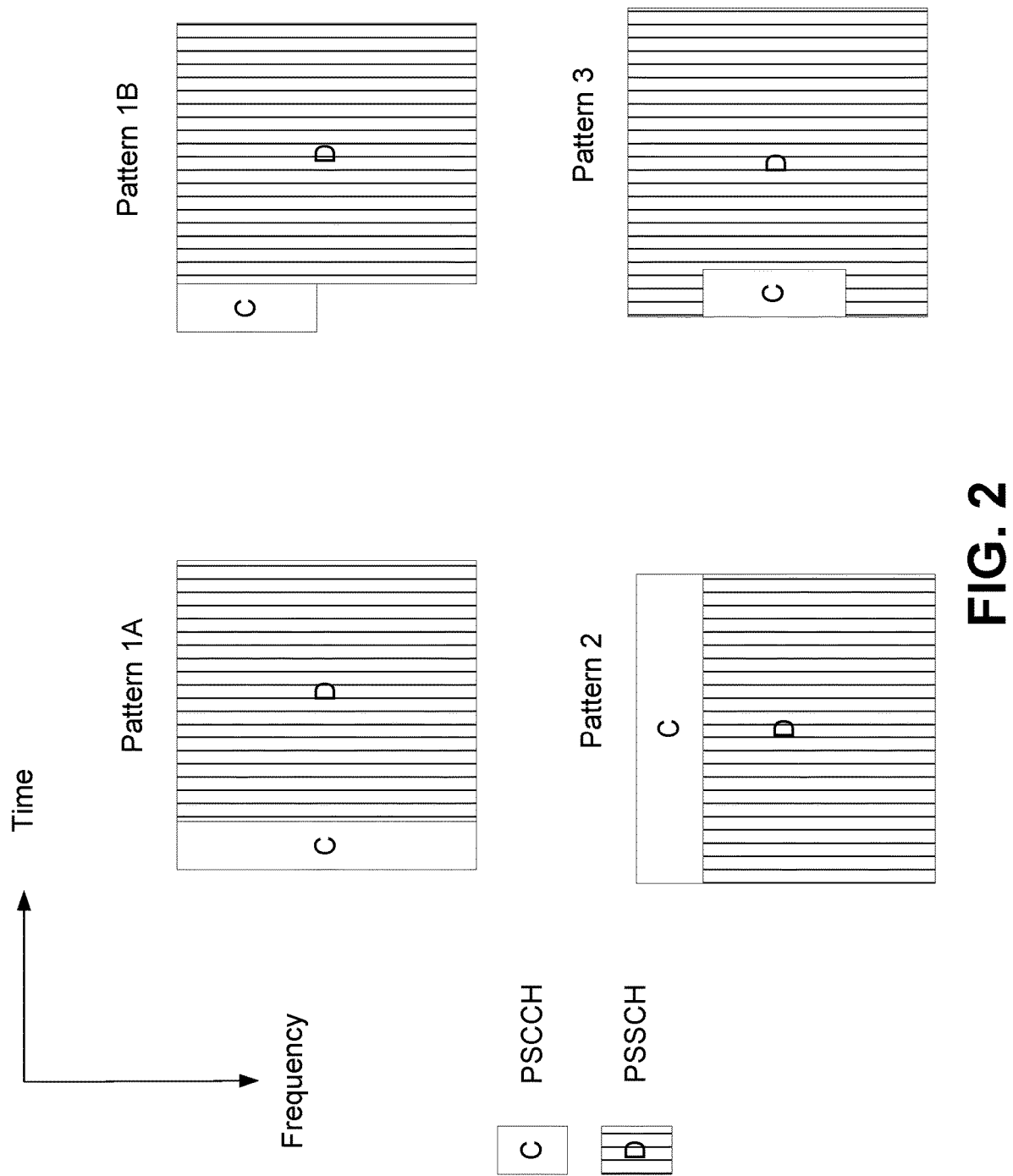

FIG. 2 illustrates example relationships, in time and frequency, between a control channel and a shared channel.

Figure 3:
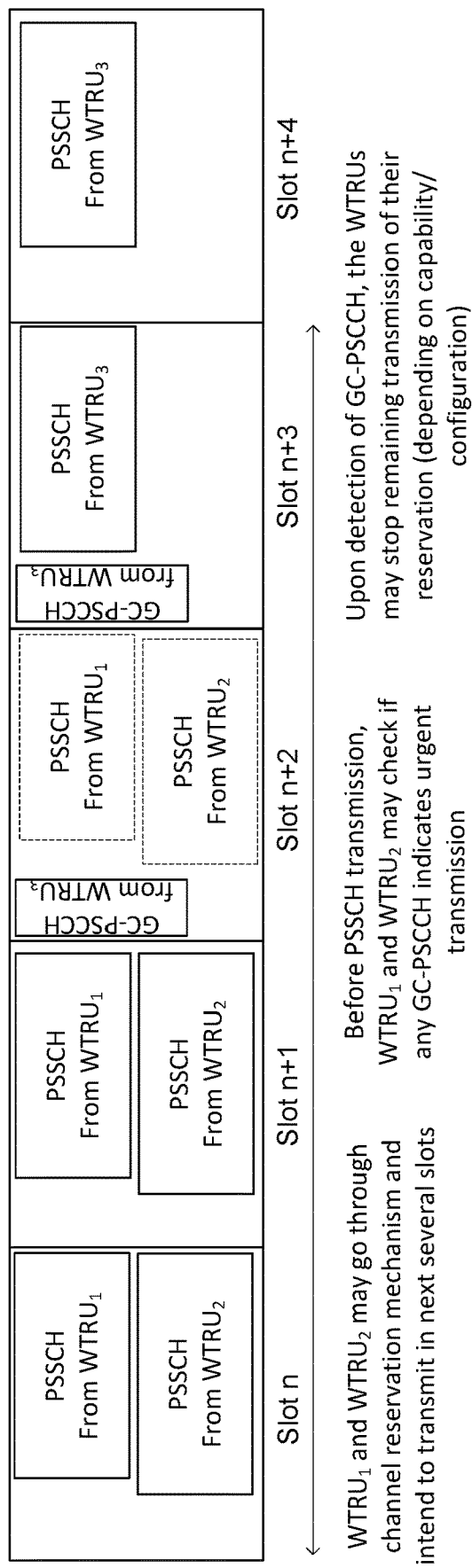

FIG. 3 illustrates an example transmission sequence in which a WTRU may use an indication in a control channel to pre-empt other WTRUs' (e.g., lower priority) transmissions.

Figure 4:
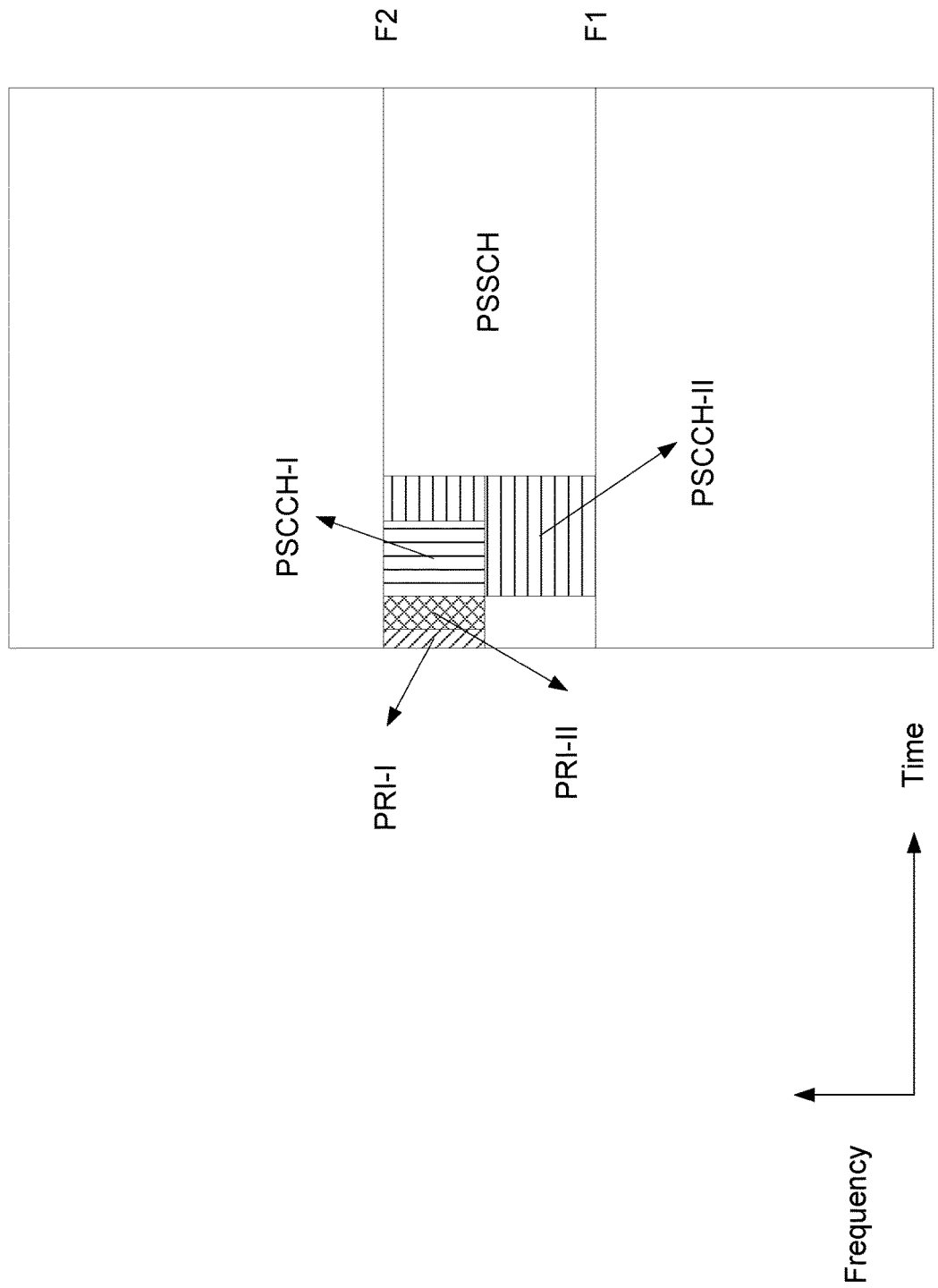

FIG. 4 illustrates an example pre-emption indicator (PRI) transmission.

Figure 5:
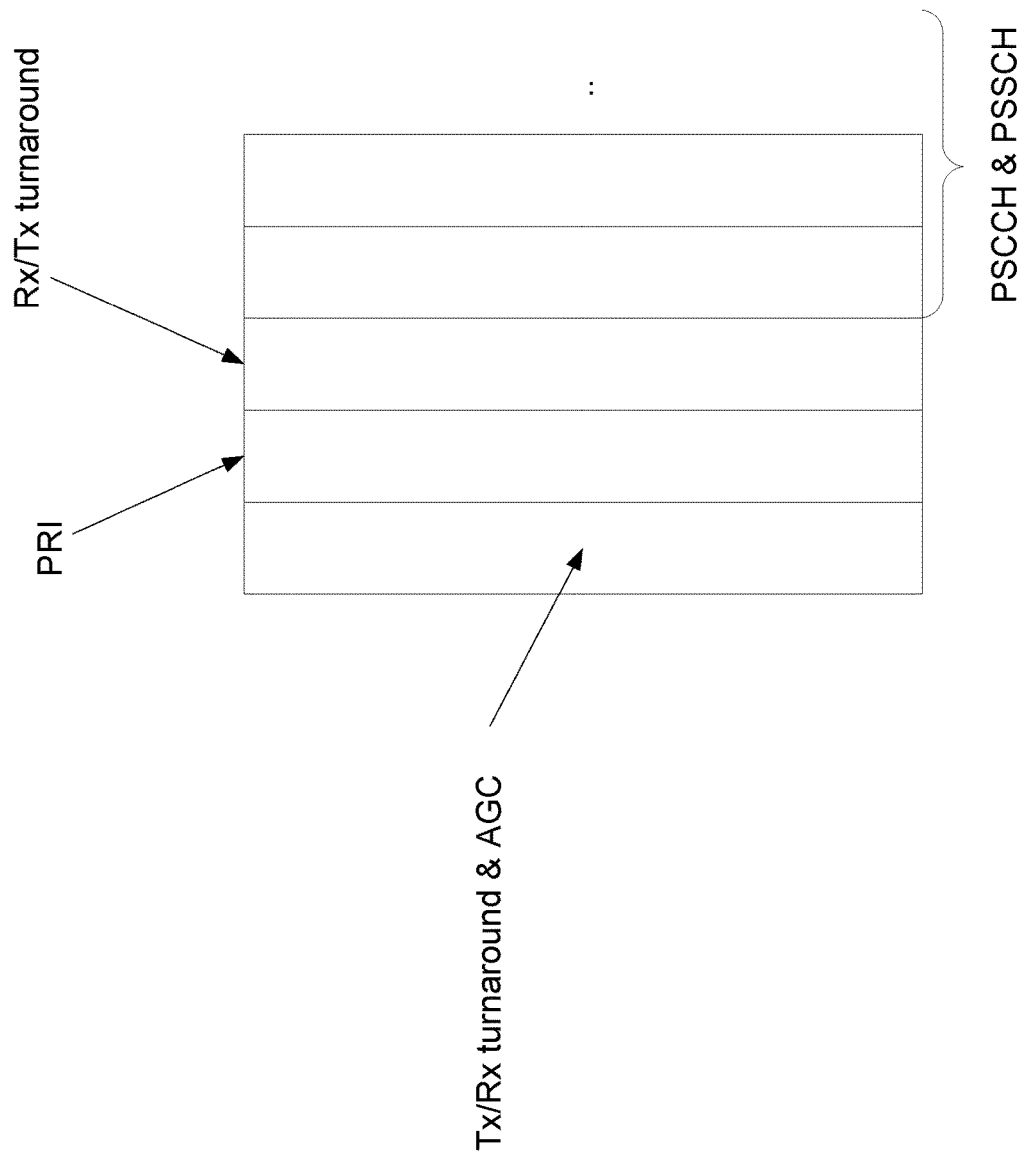

FIG. 5 illustrates an example PRI detection timing.

Figure 6:
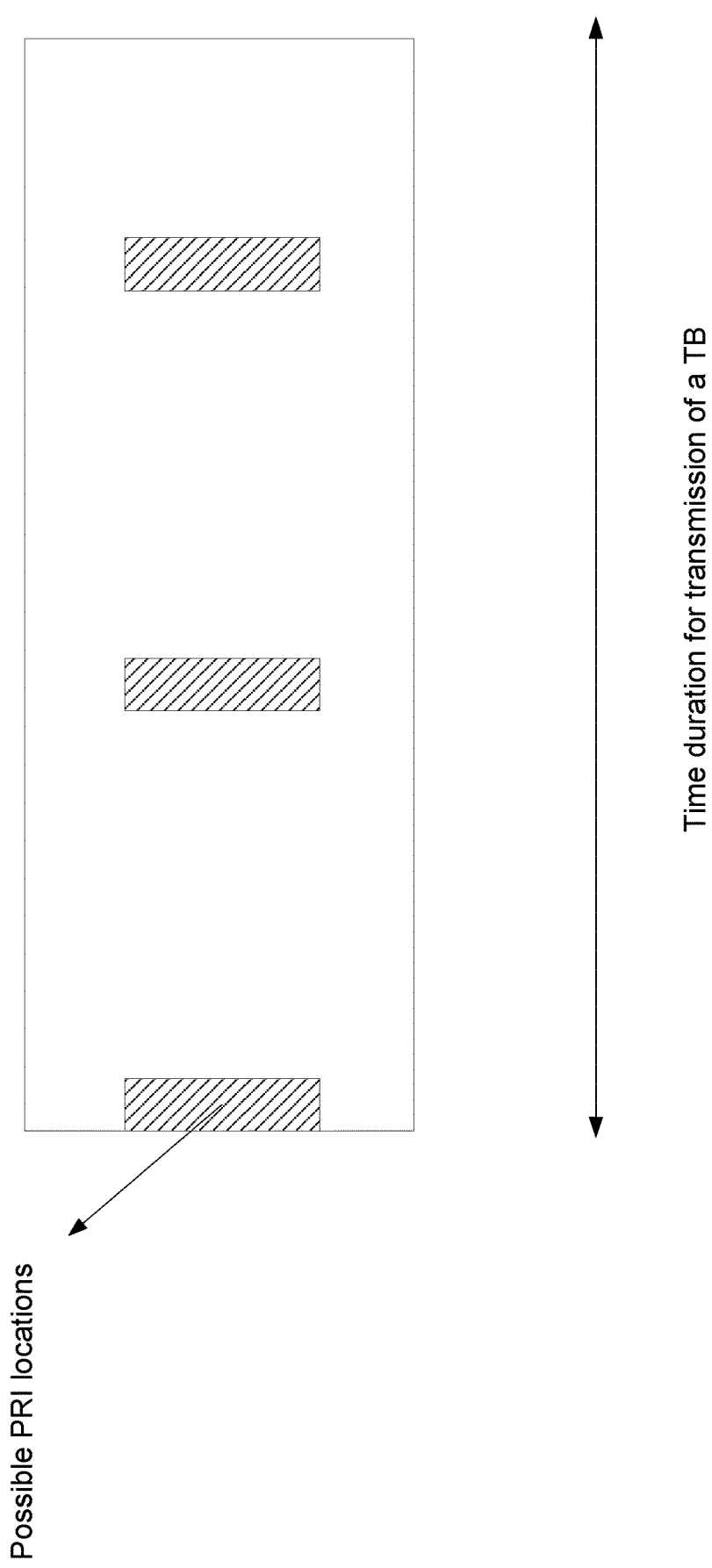

FIG. 6 illustrates an example of PRI transmission opportunities within a transport block.

Figure 7:
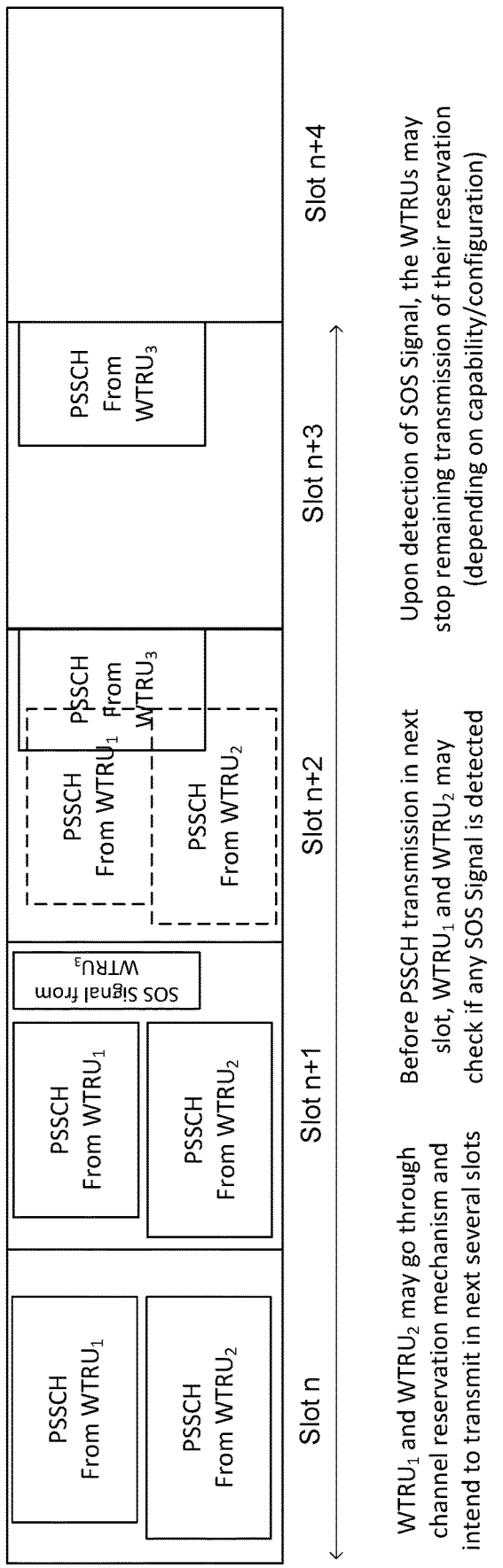

FIG. 7 illustrates an example transmission sequence in which a WTRU may send a (e.g., interruption) signal to pre-empt other WTRUs' (e.g., lower priority) transmissions.

Figures 8A, 8B:
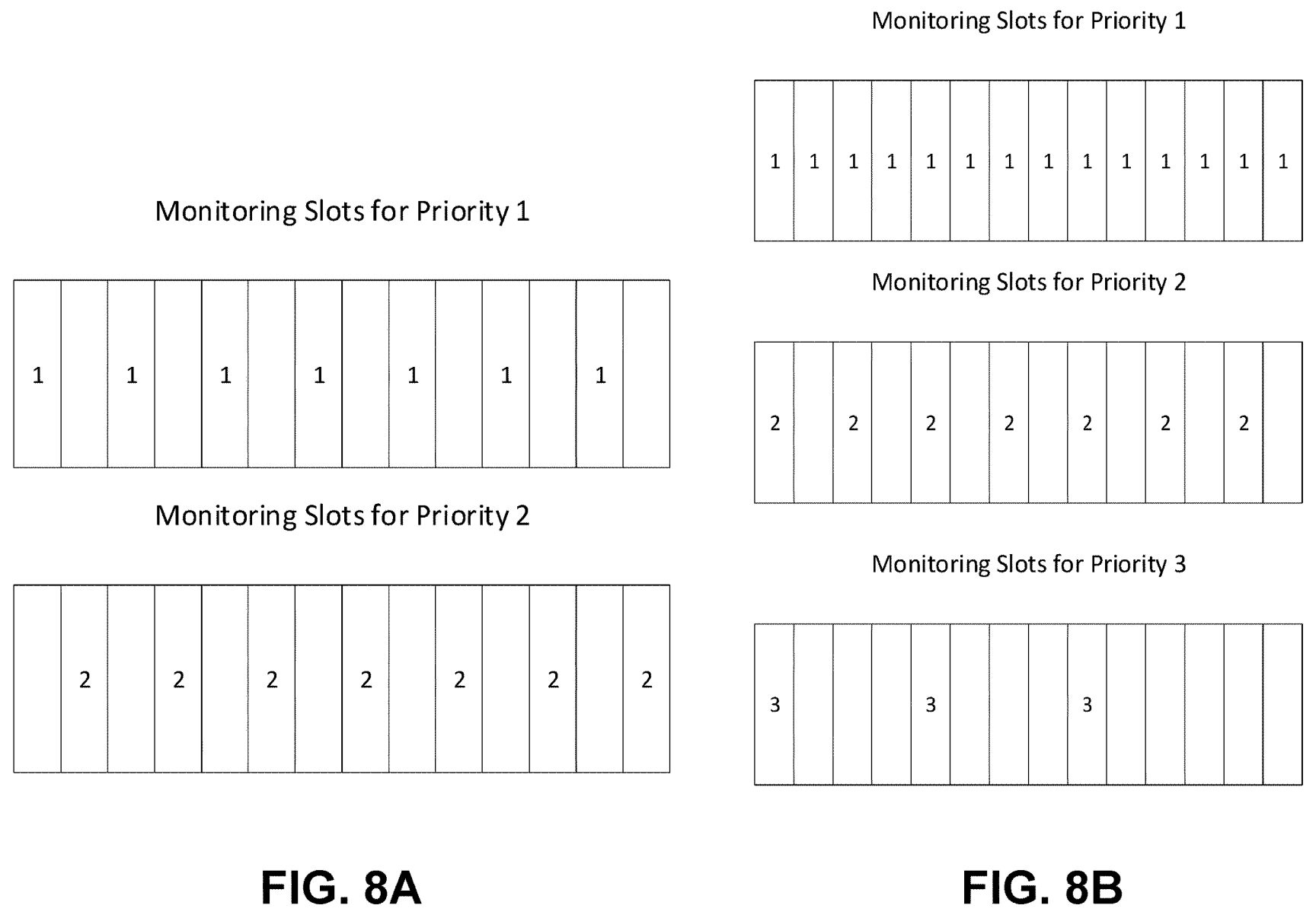

FIG. 8A illustrates an example even-odd type pre-emption prioritization scheme.

FIG. 8B illustrates an example interlaced pre-emption prioritization scheme.

Figure 9:
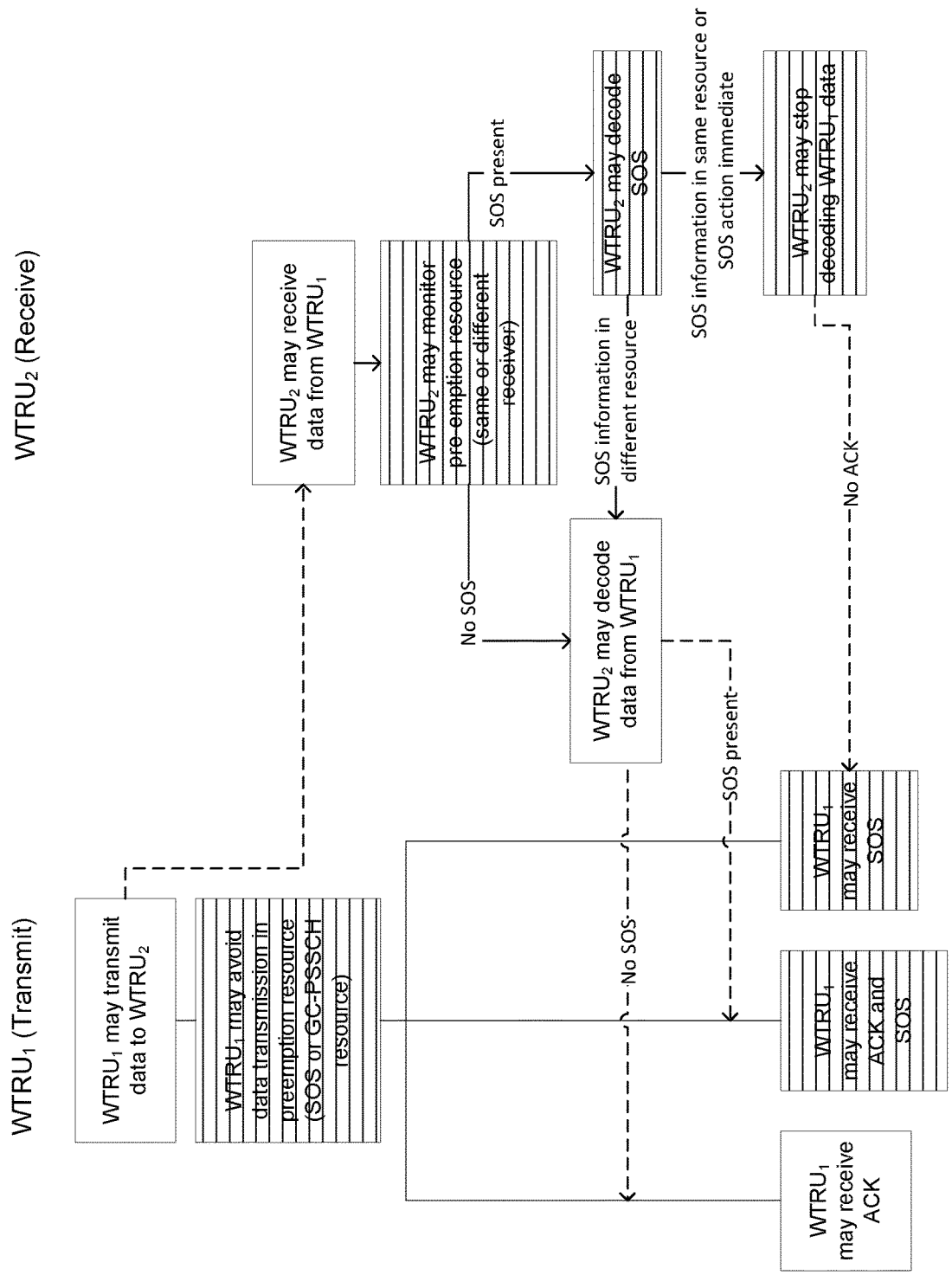

FIG. 9 illustrates an example for a receiving WTRU to alert a transmitting WTRU of a pre-emption signal.

Figure 10:
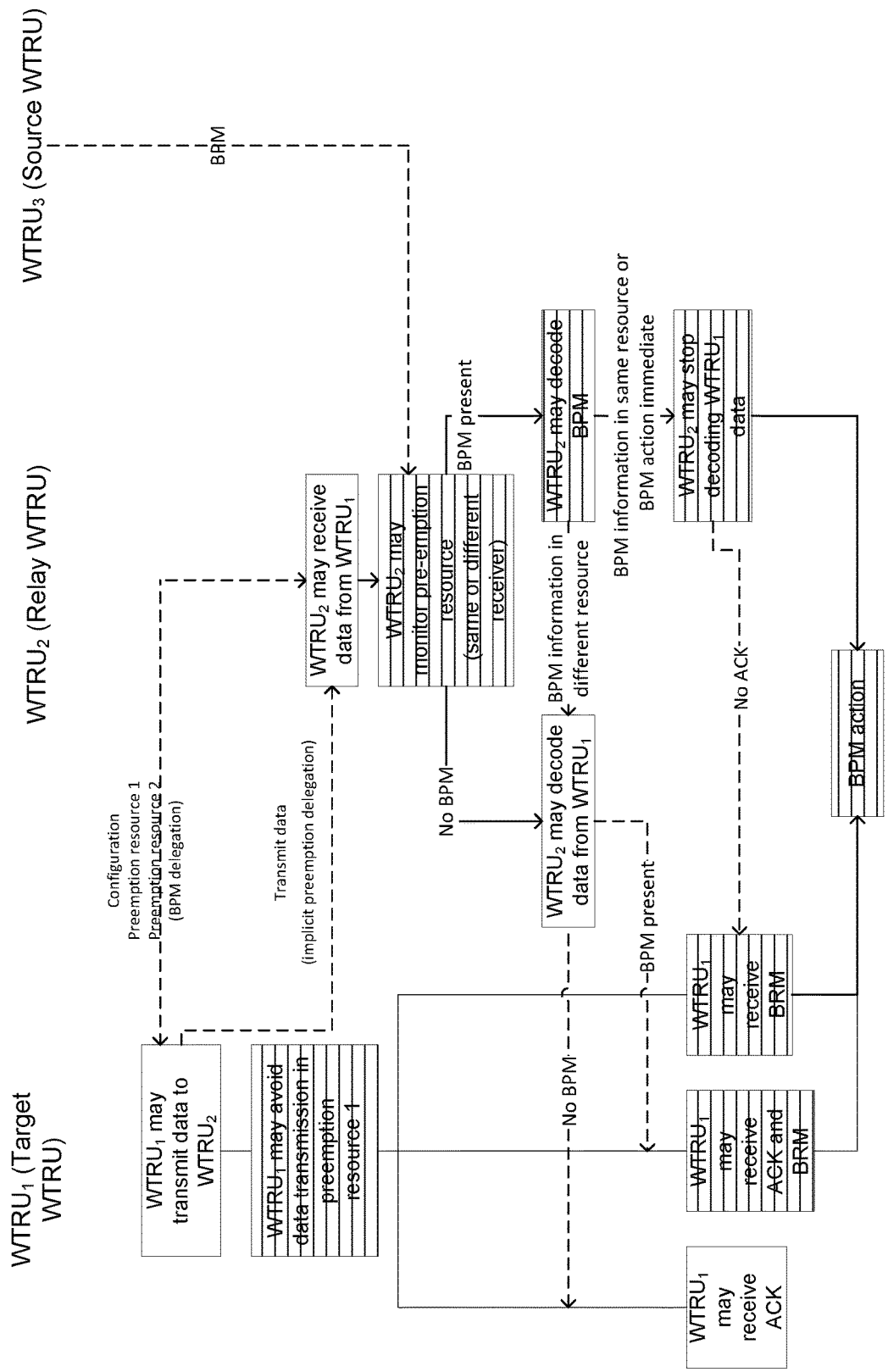

FIG. 10 illustrates example action(s) associated with preemption.

Figure 11:
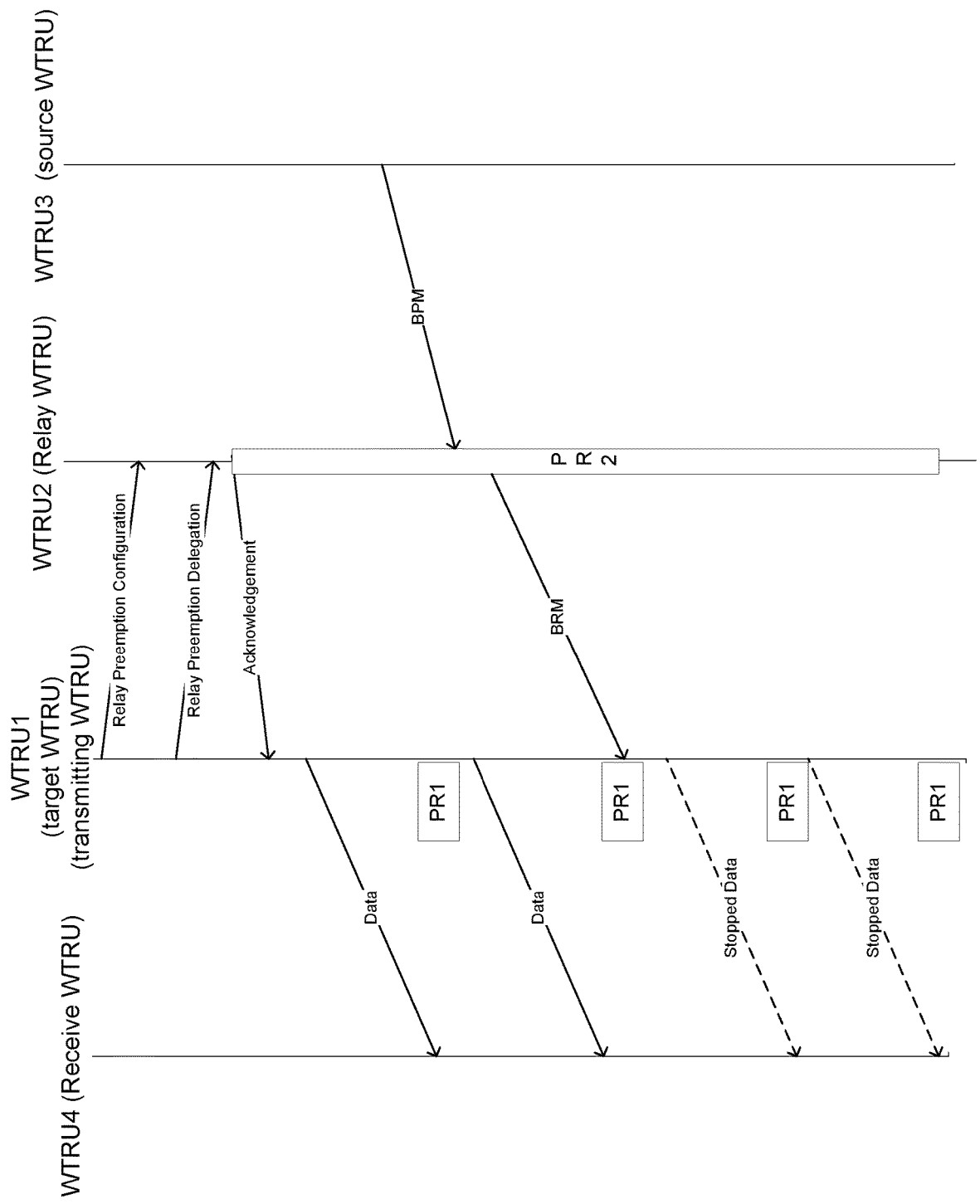

FIG. 11 illustrates example action(s) associated with relay preemption.

DETAILED DESCRIPTION

A detailed description of illustrative embodiments will now be described with reference to the Figures. Although this description provides a detailed example of possible implementations, it should be noted that the details are intended to be exemplary and in no way limit the scope of the application.

Wireless communication systems, such as 3GPP New Radio (NR), may support various use cases. Example use cases include, but are not limited to, ultra-reliable low-latency communication (URLLC), massive machine-type communication (mMTC), and/or enhanced mobile broadband (eMBB) communication. mMTC may support communications between devices that are low-cost, massive in number and/or battery-driven. mMTC may involve applications such as smart metering, logistics, and/or field and body sensors. URLLC may enable devices and machines to communicate with ultra-reliability, low latency and high availability, which may facilitate vehicular communication, industrial control, factory automation, remote surgery, smart grids, public safety applications, etc. eMBB may include improvements on other technologies, such as MBB in Long Term Evolution (LTE) and/or LTE-Advanced (LTE-A).

In an example use case, a central node (e.g., a Node B (NB), eNB, gNB, etc.) may serve one or more wireless devices or wireless transmit/receive units (WTRUs). A WTRU's ability to transmit one or more transport blocks (TBs) may be administered by the central node. The central node may schedule individual WTRU transmissions by, for example, assigning and/or granting separate time-frequency resources to each WTRU. Such an arrangement for data transmission may be referred to as grant-based transmission. Communications between two nodes (e.g., between two WTRUs) may occur outside of a scheduled grant. In such a situation, a WTRU may transmit or receive data (e.g., one or more TBs) with limited or no involvement from the central node, such as when the WTRU is outside of the central node's wireless coverage. The direct exchange of data between two WTRUs may be of a low-latency nature.

Low-latency communications may be used to facilitate various wireless applications, such as public safety communication, vehicular communication, etc. Low-latency communication may or may not be administered by a central node, such as a gNB. Autonomous low latency (ALL) communication may support use cases in which communications between WTRUs are administered with limited or no involvement by the central node. For example, ALL may be used to facilitate vehicular communication when the vehicles are beyond the coverage of the central node and/or when the exchange of information between the vehicles may occur with minimal latency.

To facilitate low latency communication, a WTRU may be configured for grant free (GF) or configured grant (CG) uplink (UL) transmissions. A central node, such as a gNB, may assign a time-frequency resource to one or more WTRUs, which may transmit one or more respective TBs via the assigned resource. The GF transmission may include one or more attributes, which may or may not be managed by the central node. An attribute may include a K-repetition feature in which a TB may be transmitted by repetitions over K GF resources before a response (e.g., an acknowledgement (ACK) or negative acknowledgement (NACK)) is received, or expected to be received, from the central node. The central node may manage the attribute(s) of the GF transmission via any suitable mechanism, such as by way of a radio resource control (RRC) configuration or by downlink control information (DCI). In an ALL communication use case, one or more of the attributes of the GF transmission may not be managed by the central node. As such, a WTRU attempting to transmit or receive data may employ (e.g., additional) mechanisms to determine the attribute(s) and/or the need for an attribute adjustment. The WTRU may adjust the attribute(s) and/or inform other WTRUs of the attribute(s) and/or attribute adjustment.

GF transmissions with K-repetition may achieve higher reliability, as the repetitive transmission of information may increase the likelihood of the information being successfully received. This may be useful in various applications, such as in vehicular communications. As more WTRUs attempt to utilize the GF transmission and/or the K-repetition feature, the potential for data collisions may increase, which may negatively affect reliability. For example, if vehicular traffic is slow and/or there are multiple vehicles in close proximity to one another, the transmission load of each vehicle may be high. As such, a vehicle's GF transmission may not be successfully received due to collisions with the GF transmissions from one or more of the other nearby vehicles.

Pre-emption techniques have been utilized to facilitate low latency communications. Such techniques may be administered by the central node. In the event the central node is not involved in managing UL resources, such as in the case of vehicles employing ALL communication, pre-emption may be administered by one or more WTRUs (e.g., vehicles) in communication with one another.

Control content related to the transmission of a TB may be communicated to a WTRU that is the intended recipient of the TB. In ALL communication, some or all of the control content may or may not be known in advance, depending on whether the transmission is broadcast or unicast. Some parts of the control content may need to be known before other parts of the control content. Some parts of the control content may appear in a DCI or UCI. Other parts may be configured by an RRC entity.

In autonomous communications, there is a chance of collisions during the transmission by more than one WTRU. The effect of collisions may be more pronounced in low latency transmissions.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include WTRUs 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A WTRU may be configured with one or more types of grant free (GF) uplink (UL) transmissions with one or more attributes. In an example Type I GF UL transmission, the WTRU may be configured to access GF resources via an RRC configuration. In an example Type II GF UL transmission, the WTRU may be configured to access the GF resources via the RRC configuration and/or DCI signaling. Access to GF resources may be activated, deactivated, or reactivated via the RRC configuration and/or the DCI signaling.

The GF UL transmission may be configured for slot-based and/or mini-slot-based transmissions. Acknowledgment, hybrid automatic repeat request (HARQ) feedback, and retransmission may be provided, such as a grant-based retransmission of a TB after a failure of the GF transmission and/or a GF transmission of a TB with up to K repetitions (e.g., K=8) across (e.g., consecutive) GF resources. The GF transmission may be terminated prior to completion of the K repetitions upon an acknowledgment indication, such as an implicit acknowledgement indication, received by the WTRU.

The GF UL transmission may include HARQ attributes (e.g., implicit HARQ attributes), such as no explicit HARQ-ACK feedback. The feedback may be implicit using a new data indicator (NDI) field in a DCI format, which may explicitly indicate an UL HARQ process identification (ID). The HARQ ID may be derived from a selected resource. For example, the HARQ Process ID may be derived as follows:

HARQ Process ID=floor (X/UL-TWG-periodicity) mod UL-TWG-numbHARQproc.

X may include a symbol index of a start of a repetition bundle. X may be derived as follows:

X=(SFN*SlotPerFrame*SymbolPerSlot+ Slot_index_In_SF*SymbolPerSlot+Symbol_Index_In_Slot).

A HARQ redundancy version (RV) sequence may be obtained from a configuration, which may include RV cycling and/or RV0 repetition.

GF UL transmissions may be periodic, with one or more transmission opportunities for repetition in each period. Transmission opportunities may have (e.g., be tied to) an RV order, such as {0,2,3,1}, {0,3,0,3}, and/or {0,0,0,0}. An initial repetition transmission may start with RV0. The timing of repetition transmissions may be flexible.

A relative time-frequency relationship may exist between control and shared channels, which may be used to transmit control information and user data, respectively. FIG. 2 illustrates example relationships between a control channel and a shared channel in time and frequency. For example, FIG. 2 illustrates patterns for the relative location of a control channel (e.g., a physical sidelink control channel (PSCCH)) and associated shared channel (e.g., a physical sidelink shared channel (PSCCH)). The control and shared channels may be part of a wireless network employing NR technology, for example. As shown in pattern 1A of FIG. 2, the control channel may appear (e.g., appear immediately) before the shared channel. The control and shared channels may each span one or more OFDM symbols. The shared channel may span a greater number of symbols than the control channel. The control and shared channels may span the same number of frequency or resource blocks.

In pattern 1B shown in FIG. 2, the control channel may appear (e.g., appear immediately) before the shared channel. The frequency span of the control channel may include a subset of the frequency span of the shared channel.

In pattern 2 shown in FIG. 2, the control channel may appear during the same OFDM symbols as the shared channel. The frequency span of the control channel may be different than the frequency span of the shared channel. For example, the control channel may appear at an edge of the shared channel.

In pattern 3 shown in FIG. 2, the control channel may be within the shared channel.

Autonomous low latency (ALL) communications may be implemented in one or more use cases, such as vehicular communications. ALL communication for vehicles may be used when the vehicles are outside the wireless coverage of a central node, such as the gNB. Platooning may be part of a cooperative driving use case in which vehicles may move in the same lane (or different-lanes) in the same direction. The vehicles may keep a (e.g., small) relatively constant inter-vehicle distance, which may help the vehicles to reduce fuel consumption and/or achieve safe and efficient transport. The vehicles may include one or more sensors and may exchange one or more sensor outputs with one another (e.g., using the ALL communication framework). For example, a vehicle may inform other vehicles about an unexpected event in the road, which may enable the other vehicles to plan for an action (e.g., an individual action). As a platoon, the vehicles may plan for a synchronized action.

GF transmissions may include one or more adaptive attributes. A central node (e.g., a gNB) may manage the attribute(s) of a GF transmission, such as via RRC configuration or via adjustment of the attribute(s) by DCI. In the event where the attribute(s) are not managed by the central node, such as during ALL communication, a WTRU may go through additional mechanisms to adjust the attribute(s) of the GF communication.

For example, if a WTRU is beyond the wireless coverage of the central node, the WTRU may determine the attribute(s) of the GF transmission. The WTRU may be in a vehicle-to-everything (V2X) mode (e.g., V2X Mode 2). The WTRU may determine a value, such as a default value, for K-repetitions. The value of K may indicate a number (e.g., large number) of repetitions. If the WTRU is attempting to transmit in a less dense area with fast moving WTRUs (e.g., vehicles), a large number of repetitions may help to achieve high (e.g., higher) reliability. In a dense environment with slow moving vehicles, and/or when the WTRU has a large amount of data to transmit, a large number of repetitions may negatively affect transmission reliability. The large number of repetitions may result in more data collisions, which may reduce reliability.

A WTRU may start with a value, such as a moderate value, for K-repetitions. Whether the value of K is deemed moderate, high, or low in a particular case may depend on one or more factors, such as transmission priority and/or reliability class. The WTRU may monitor one or more indicators at a given instance and/or over a period of time. The indicators may include one or more of the following: a success rate of unicast transmissions; channel utilization; and/or a number of distinct WTRUs utilizing a channel over a (e.g., past) unit of time or time interval. For example, a success rate of unicast transmission may include a number of ACKs, averaged over a unit of time, and/or the like. For example, channel utilization may include a number of time-frequency resources occupied by other WTRUs, averaged over a unit time, and/or the like. The WTRU may compare one or more of the foregoing indicators with a respective threshold. Based on a result of the comparison, the WTRU may determine to reduce the value of K-repetitions, increase the value of K-repetitions, and/or keep the value of K-repetitions unchanged.

In examples, if a number of acknowledged unicast TBs sent by the WTRU is lower than a threshold, the WTRU may increase the K-repetition value. If a number of acknowledged unicast TBs sent by the WTRU is higher than the threshold, the WTRU may decrease the K-repetition value. If a number of acknowledged unicast TBs sent by the WTRU is approximately equal to (e.g., or equal) the threshold, the WTRU may not change the K-repetition value. The WTRU may continue to monitor the number of received ACKs to determine whether to further adjust the K-repetition value.

In examples, the WTRU may measure the (e.g., overall) utilization of a channel to determine a ratio of the WTRU's own transmissions to the overall channel utilization. A ratio above a threshold may indicate that the WTRU may be utilizing a higher proportion of the GF resource (e.g., higher than what may be deemed a fair proportion). The WTRU may lower the K-repetition value to lower the ratio.

Additionally and/or alternatively, the WTRU may consider a number of WTRUs (e.g., distinct WTRUs) that are utilizing the channel. For example, the number of distinct WTRUs that are utilizing the channel may be indicative of the extent to which WTRUs are competing for GF resources. The WTRU may use the number of WTRUs utilizing the channel to determine whether to adjust the K-repetition value. For example, if the number of WTRUs utilizing the channel is lower than a threshold, the WTRU may adjust the K-repetition value higher. If the number of WTRUs utilizing the channel is higher than a threshold, the WTRU may adjust the K-repetition value lower. If the number of WTRUs utilizing the channel is approximately equal to the threshold, the WTRU may not change the K-repetition value. The WTRU may keep monitoring the number of WTRUs utilizing the channel. The WTRU may reevaluate/adjust the K-repetition value, e.g., based on its estimate.

To obtain the number of WTRUs (e.g., distinct WTRUs) that are utilizing the channel, the WTRU may track one or more attributes of received signals/channels. The one or more attributes may be averaged over a (e.g., sliding) unit time interval. For example, the WTRU may track: a number of WTRU ID(s) (e.g., unique WTRU ID(s)) detected in received side link channels; a number of DMRS sequences (e.g., unique DMRS sequences) detected in received side link channels; a number of attempts for side link synchronization by WTRUs (e.g., unique WTRUs); and/or a number of received discovery signals (e.g., unique received discovery signals).

Reducing the number of K-repetitions (e.g., the K-repetition value) may or may not reduce the reliability of the WTRU's transmissions. If the reduction of K-repetitions reduces transmission reliability, the WTRU may adjust one or more other parameters, for example to compensate (e.g., increase transmission reliability).

For example, the WTRU may reduce the modulation and coding scheme (MCS), such as by reducing the modulation and/or increasing the coding rate of the information being transmitted. Reducing the MCS may result in the need for additional resources per transmission. If the amount of resources remains the same, the amount of data that is able to be transmitted may be reduced and/or limited. The WTRU may limit transmissions to high priority information, e.g., to ensure that the WTRU may increase the coding rate and/or reduce the MCS.

A first WTRU may receive discovery channel transmission(s) of at least one other WTRU. The first WTRU may perform measurements to assess the quality of a link between the first WTRU and the transmitting WTRU(s). If the first WTRU intends to initiate a transmission with one of the identified WTRU(s), the first WTRU may choose and/or use an initial repetition value based on the performed measurement. The repetition value may be adapted (e.g., after choosing and/or using the initial repetition value) by using technique(s) described herein and/or using channel state information (CSI) feedback or measurement.

The WTRU may adjust a power control (e.g., Loop ID, P0-PUSCH Alpha, etc.). It will be appreciated that the WTRU may adjust the other parameters of the GF transmission, such as MCS and/or power control, in a manner similar to the adjustment mechanism for the K-repetition value.

GF transmissions between WTRUs, such as those occurring as part of ALL communication, may include the exchange of autonomous feedback information (AFI) (or sidelink feedback information). AFI may be transmitted within PSCCH.

A receiving WTRU may be engaged in ALL communications with an initiating (e.g., transmitting) WTRU and may send a control channel transmission to the initiating WTRU to suggest alternative attributes for a communication (e.g., an upcoming communication) between the WTRUs. For example, the initiating WTRU may have started one or more GF transmissions with a K repetition value (e.g., a maximum K repetition value). The receiving WTRU may suggest alternative K-repetition values (e.g., lower K-repetition values) to the initiating WTRU, e.g., via the control channel.

As noted above, WTRUs (e.g., vehicles) may move in the same lane (or different-lanes) in the same direction, which may be referred to as platooning. The QoS of the transmissions of the WTRUs may be maintained across layers. In the physical layer, at least some aspects of the QoS may be maintained by ACK and/or HARQ mechanism(s).

For example, the initiating or transmitting WTRU may assign a HARQ ID for a TB. One or more of the receiving WTRU(s) may: receive the TB; receive the TB without error; receive the TB erroneously; and/or receive some of the code blocks erroneously. As such, the transmitting WTRU may keep the transport block in its buffer for a preconfigured duration. The transmitting WTRU may retransmit the TB, portions of the TB, and/or the code blocks that have been identified in the (e.g., individual) HARQ feedback from receiving WTRU(s) (e.g., during the preconfigured duration) as not being correctly received. After the expiration of the preconfigured duration, the WTRU may discard the TB.

ALL communication may be preempted. Communications between WTRUs, such as vehicular communications, may involve transmissions with different priority and/or latency service requirements. A WTRU may have data or information to transmit that may be deemed high priority (e.g., relative to the data or information from other WTRUs) and/or that may have a latency requirement (e.g., a stringent latency requirement). If there is no central node (e.g., a gNB) to administer high-priority and/or low latency transmissions, the WTRU may signal to other WTRUs that the WTRU has high-priority and/or low latency data for transmission. The WTRU may monitor the GF resource (e.g., channel) and vacate the resource if one or more of the other WTRUs have priority data (e.g., higher priority data than the WTRU) and/or low latency requirements (e.g., more stringent low latency requirements than the WTRU).

One or more WTRUs may use a dedicated resource or channel in a side link (e.g., the PSCCH) to handle high-priority and/or low latency requirements. The WTRUs may use a group common PSCCH (GC-PSCCH) and may be configured with or know the default location of the GC-PSCCH. A WTRU with high-priority and/or low latency data may send a GC-PSCCH with one or more attributes (e.g., a priority value, whether the transmission is unicast/group-cast or broadcast, the intended WTRU ID if the transmission is unicast, the intended group ID if the transmission is multicast, etc.). The WTRU may indicate the resource ID, time reference, and/or duration that the WTRU intends to use the channel for transmission of the high-priority and/or low latency data. As shown in FIG. 3, the WTRU may send the GC-PSCCH more than once in the configured/default search space for GC-PSCCH, which may facilitate the detection of the GC-PSCCH by other WTRUs. The WTRU may repeat the GC-PSCCH in the configured/default search space. The WTRU may repeat the GC-PSCCH while the WTRU transmits the high-priority and/or low-latency data via PSSCH. When sending one or more GC-PSCCH, the WTRU may adjust a time attribute within the GC-PSCCH that indicates the duration of the high-priority and/or low latency data in the PSSCH transmission.

If a WTRU has lower priority and/or less stringent latency requirements (e.g., relative to other WTRUs), the WTRU may yield to one or more of the other WTRUs (e.g., WTRUs with higher priority and/or more stringent latency requirements). Before transmitting in a slot (e.g., each slot), the WTRU may monitor one or more OFDM symbols (e.g., the first few OFDM symbols) within the slot corresponding to a search space of the GC-PSCCH. If the GC-PSCCH includes an indication of high-priority and/or low latency data traffic, the WTRU may detect the indication and abandon the transmission of data in the slot. The WTRU may refrain from transmitting data in the next slot and/or in a number of subsequent slots depending on one or more of the attributes of the high-priority data identified in the GC-PSCCH.

FIG. 3 illustrates an example in which a WTRU (e.g., including a user equipment (UE)) may refrain from transmitting data based on indications of high priority and/or low latency data in the GC-PSCCH. $WTRU_1$ and $WTRU_2$ may have a resource allocation from an allocation mechanism and may be engaged in the transmission of data. In each slot, $WTRU_1$ and $WTRU_2$ may perform a GC-PSCCH search. If $WTRU_1$ and $WTRU_2$ do not detect a GC-PSCCH indicative of high priority and/or low latency data, $WTRU_1$ and $WTRU_2$ may transmit (e.g., continue to transmit) respective data, such as during slot n and n+1 shown in FIG. 3. If one or both of the WTRUs detect a GC-PSCCH indicative of high priority and/or low latency data, the WTRUs may abandon their respective transmissions. As shown in FIG. 3, $WTRU_1$ and $WTRU_2$ may detect a GC-PSCCH indicative of high priority and/or low latency data from $WTRU_3$ during slot n+2. Depending on the capability and/or configuration of $WTRU_1$ and $WTRU_2$, $WTRU_1$ and $WTRU_2$ may stop their transmissions within the same slot that the GC-PSCCH is detected (e.g., slot n+2) and/or in one or more subsequent slots (e.g., slot n+3, slot n+4, etc.). $WTRU_3$ may begin transmitting in slot n+2 or n+3.

More than one WTRUs may have high-priority and/or low latency data to transmit. The WTRUs may send a GC-PSCCH during the same slot, which may increase the likelihood of collision. As such, multiple search spaces may be assigned/configured for transmission of GC-PSCCH. The WTRUs (e.g., each WTRU) may choose (e.g., randomly choose) one of the configured/default locations to transmit the GC-PSCCH indicative of a high-priority traffic.

Pre-emption may be indicated with a pre-emption indicator (PRI). One or more of the following may apply.

The PSCCH may include at least two stages (e.g., PSCCH-I and PSCCH-II), for example as shown in FIG. 4. FIG. 4 illustrates an example PRI transmission. The first stage (PSCCH-I) may carry control channel information (e.g., limited control channel information). For example, PSCCH-I may include one or more of the following: the location of the second stage control channel (PSCCH-II), information associated with reserving the resource pool, traffic type, etc. PSCCH-I, or PSCCH-I together with PSCCH-II, may serve as a reservation signal, e.g., WTRUs that decode PSCCH-I transmission from a first WTRU would be able to receive information pertaining to which resources and/or how long these resources are reserved by the first WTRU. PSCCH-I and/or PSCCH-II may be transmitted in a set of configured CORESETs within the accessed resource pool.

In examples, a preemption indication signal (PRI) may comprise at least a stage (e.g., one stage) and may be transmitted before the PSCCH, e.g., as shown in FIG. 4. In FIG. 4, a PRI may comprise two stages, e.g., PRI-I and PRI-II. FIG. 4 is an example representation of a possible slot format and/or the PRI, the PSCCH, and/or the PSSCH may not be transmitted by the same WTRU. A PRI may be transmitted by a WTRU intending to preempt the resource pool from another WTRU, e.g., another WTRU that has already gained access to the resource pool. Without loss of generality and for the purpose of example, a WTRU that intends to preempt the resource pool from another WTRU may be referred to as an "URLLC-WTRU" and a WTRU whose transmission is preempted may be referred to as a "nonURLLC-WTRU."

The PRI may be one stage, and, one or more of the following may apply. If detected by a nonURLLC-WTRU, the PRI may indicate that the resource pool in which the PRI is transmitted is reserved for the URLLC-WTRU, e.g., the nonURLLC-WTRU may not perform transmission within the resource pool. The resource pool may be slot based or non-slot based. If detected by the nonURLLC-WTRU, the PRI may indicate that a set of pre-configured resources within the resource pool in which the PRI is transmitted is reserved for the URLLC-WTRU, e.g., the nonURLLC-WTRU may not perform transmission within these resources. More than one set of resources within the resource pool may be pre-empted. Each respective set of resources may be associated with a respective PRI. Detection of a PRI may indicate the preemption of the associated resources. Different PRIs may be differentiated by at least one of: the indices of the CORESETs on which PRIs are transmitted; a physical layer attribute, such as frequency location of the PRI; an associated sequence index; an associated cyclic shift index; etc. A PRI may comprise information associated with the resources within the resource pool that are preempted by the URLLC-WTRU.

The PRI may comprise at least two stages. In the following, for the purpose of explanation, it may be assumed that the PRI comprises two stages, e.g., PRI-I and PRI-II. These techniques may be similarly be applicable to cases with the PRI comprising more than two stages. PRI-I may indicate that a URLLC-WTRU is going to preempt a planned/ongoing transmission of a nonURLLC-WTRU. PRI-I may indicate the location of PRI-II. PRI-II may comprise information associated with the location(s) of the resources intended to be used by the URLLC-WTRU, transmission attributes of the URLLC-WTRU, etc.

The following may apply to the technique(s) that are applicable to the WTRU whose transmission is pre-empted, e.g., the nonURLLC-WTRU. A resource pool may be configured with an attribute "pre-emptible." When a non-URLLC-WTRU gets access to a resource pool with such attribute, the nonURLLC-WTRU may assume that its transmission in this resource pool may be pre-empted by another WTRU, e.g., a URLLC-WTRU. The nonURLLC-WTRU may be configured to detect possible PRI transmissions of URLLC-WTRUs, e.g., for pre-emption information. In TDD mode, a WTRU may not be able to transmit and receive at the same time. FIG. 5 illustrates an example PRI detection timing. The non-URLLC WTRU may have to switch to receive mode during the OFDM symbols on which possible PRI transmission may take place. As shown in FIG. 5, PRI detection may take several OFDM symbols. A portion of an OFDM symbol or at least one OFDM symbol may be allocated to possible Tx/Rx turnaround time and automatic generation control (AGC) settling; one or more OFDM symbols may be allocated to the actual PRI reception. Depending on the contents of the PRI and/or whether thr PRI was detected or not, the nonURLLC-WTRU may spend some time for Rx/Tx turnaround, and, the nonURLLC-WTRU may commence transmission of PSCCH and PSSCH, e.g., if possible.

A nonURLLC-WTRU that has gained access to the resource pool may try to detect the PRI and decode the contents thereof, e.g., of PRI-I and possibly PRI-II (e.g., if it is detected).

In examples, the resource pool is pre-emptible, but a PRI is not transmitted by a URLLC-WTRU. FIG. 6 illustrates an example of PRI transmission opportunities within a transport block. FIG. 6 shows an example of possible PRI transmission opportunities of a URLLC-WTRU and how these opportunities may collide with the time/frequency resources reserved for the transmission of a transport block (TB) of a nonURLLC-WTRU. If no PRI is expected, the nonURLLC-WTRU may commence and finish transmission of the TB. If PRI transmission is possible, the nonURLLC-WTRU may stop its transmission and switch to receive mode, e.g., when there is a possibility of PRI as shown for example in FIG. 6, and, the transmission of the TB may be interrupted. The size of the TB may be constructed such that it allows for the loss of resources for possible PRI detection interruptions (e.g., the TB is prepared to fit into the resources excluding the resources that may be used for PRI detection). When mapping the TB to resources, the resources allocated for PRI detection may be skipped. The size of the TB may be such that it does not consider the loss of resources for possible PRI detection interruptions. When mapping the TB to resources, the bits that may be mapped to the resources allocated for PRI detection may be punctured. When a PRI comprises two stages, the TB may be prepared according to one of the above; the TB may consider PRI-I, e.g., only PRI-I. Similar techniques may apply if the preempted resources are non-slot based or slot-based.

In examples, the resource pool is pre-emptible, and a PRI is transmitted by a URLLC-WTRU. The size of the TB may be constructed such that it considers for the loss of resources for possible PRI detection interruptions (e.g., the TB may be prepared to fit into the resources excluding the resources that may be used for PRI detection). When mapping the TB to resources, the resources allocated for PRI detection may be skipped. If a PRI is detected and encoded, puncturing (e.g., further puncturing) may be performed, e.g., based on the contents of the PRI. The size of the TB may be such that it does not consider the loss of resources for possible PRI detection interruptions. When mapping the TB to resources, the bits that may be mapped to the resources allocated for PRI detection may be punctured. If a PRI is detected and encoded, puncturing (e.g., further puncturing) may be performed based on the contents of the PRI. When a PRI comprises two stages, the TB may be prepared according to one of the above; the TB may consider PRI-I, e.g., only PRI-I. If PRI-II is detected and encoded, puncturing (e.g., further puncturing) may be performed, e.g., based on the contents of the PRI-II.

WTRUs may decode the discovery channel information of neighboring WTRUs. The discovery channel may have an attribute that indicates if a WTRU is a URLLC-WTRU or a nonURLLC-WTRU. If a first nonURLLC WTRU is unable to detect the URLLC-WTRU from the encoded discovery channels but the resource pool that it has gained access to is pre-emptible, the first WTRU may be able to disable pre-emption such that the first WTRU may not monitor possible PRI transmissions. In this case, the first WTRU would be able to transmit its TB on one or more (e.g., all) available resources. In an alternative or in addition, the first WTRU may still transmit its own TB on one or more (e.g., all) resources but with a lowered power and possibly reduced MCS.

If a nonURLLC-WTRU needs to feedback control information, e.g., ACK/NACK for a prior transmission, and the location of the feedback channel is known, the feedback transmission may not be preempted by a URLLC-WTRU. The URLCC-WTRU may get the location information of the feedback transmission by one or more of the following. The slot format may be known by the URLLC-WTRU, for example, by configuration and/or signaling. The sensing/reservation signals transmitted by the nonURLLC-WTRU may carry location information of the feedback transmission. The location of the feedback channel may be configured, e.g., separately for each resource pool.

Pre-emption may be signaled by a WTRU, such as by way of a SOS signal or a request for interruption (RFI) signal, e.g., as illustrated in FIG. 7. FIG. 7 illustrates an example transmission sequence in which a WTRU may send a signal, such as an interruption signal, to pre-empt other WTRUs' (e.g., lower priority) transmissions. For example, a WTRU may send the SOS or RFI signal when the WTRU has high priority and/or low latency data to transmit (e.g., during ALL communication). The signal may enable the WTRU to interrupt other communications on resources (e.g., designated resources) and have those resources available for its communications (e.g., emergency communications). The resources may become available in the next slot or mini-slot, as shown in FIG. 7. The content of the signal may include an indication. The indication may be or may include a one-bit flag, indicating the RFI, or multiple bits which may include defining other/additional parameters, such as the type of SOS or RFI, a subset of interruption resources, and/or the WTRU ID.

A WTRU may implement an interruption mechanism after receiving a SOS or RFI signal. A set of resources in slot (e.g., each slot or in each consecutive k slots) may be assigned or designated. The WTRU may refrain from transmitting on these resources if the WTRU receives the SOS or RFI signal in the slot (e.g., last slot) or in one of the last k slots, where k may be pre-defined or may be configured by a central node (e.g., a gNB). The interruption may be complete or partial, based on pre-defined criteria and/or a configuration (e.g., semi-static configuration) by the central node. When implementing a complete interruption, the WTRU may halt one or more (e.g., all) PSCCH and PSSCH transmissions whose associating resources overlap with the designated interruption resources. When implementing a partial interruption, the WTRU may partially interrupt the PSSCH transmission to avoid the designated interruption resources. The PSSCH transmission may be rate-matched around the interrupted resources.

The SOS or RFI signal may be WTRU-specific or non-WTRU-specific/anonymous, which may be based on pre-defined criteria and/or a configuration (e.g., semi-static configuration) by the central node.

In the case of a non-WTRU-specific/anonymous signal, the SOS or RFI signal may not indicate the identity of the WTRU that has requested the interruption. The WTRU identity may be indicated in a secondary message, which may be sent by the WTRU on one or more designated interruption resources. The indication of WTRU ID in the secondary message may be done by a header, or by a cyclic redundancy check (CRC) that may be masked by a radio network temporary identifier (RNTI) of the WTRU. Non-WTRU-specific/anonymous signals may be useful when the probability of interruption and/or the probability of interruption collision (e.g., two different WTRUs requesting interruption at the same time) is low or otherwise acceptable. Non-WTRU-specific/anonymous signals may be transmitted specific resources that are designated for SOS or RFI signals. Non-WTRU-specific/anonymous signals may be transmitted on resources used for other purposes, such as the PSCCH and/or PSSCH. The transmission may be carried out such that the SOS or RFI signal may be separated from other transmissions. The separation may be done through power division (e.g., boosting the power for the SOS or RFI signal) and/or code division (e.g., spreading the SOS or RFI signal such that the signal may be separated from other signals and detected by a decorrelator receiver).

In the case of a WTRU-specific signal, the identity of the WTRU that is requesting interruption may be identified based on the SOS or RFI signal being transmitted by the WTRU. The ID may be included in the content of the SOS or RFI message. The ID may be derived by a CRC that is masked by the RNTI of the WTRU. The ID may be derived by a property of the SOS or RFI signal, such as a sequence that is associated with the signal. For example, each WTRU may be assigned with one or more sequences from a set of orthogonal or semi-orthogonal sequences, such as a set of Zadoff-Chu or other CAZAC sequences. As such, the WTRUs may determine the identity of the WTRU that is transmitting the SOS or RFI signal based on the detected sequence(s).

Pre-emption may include a prioritization scheme. The priority of data may be identified with a parameter. A WTRU may pre-empt other WTRUs and transmit its data if the data belongs to a number associated with the highest priority class and/or a higher priority class (e.g., top two priority classes). It will be appreciated that a WTRU with data belonging to a second highest-priority class may yield to a WTRU with data belonging to a first highest-priority class. A WTRU with data belonging to a third highest-priority class may yield to the WTRUs with data belongings to the first and second highest-priority class and so on. This may be referred to as prioritized pre-emption.

FIG. 8A illustrates an example even-odd type pre-emption prioritization scheme. The GC-PSCCH may be used to assign a highest priority data class to one or more slots (e.g., even slots). The GC-PSCCH may be used to assign a second highest priority data class to one or more other slots (e.g., odd slots). A WTRU with data belonging to the second highest priority data class may monitor the odd slots (e.g., latest odd slots). If the WTRU does not detect a GC-PSCCH indicative of the first highest priority class, the WTRU may attempt to transmit its own GC-PSCCH indicative of the second highest priority class in an upcoming slot (e.g., even slot). If the WTRU detects a GC-PSCCH indicative of the first highest priority class, the WTRU may refrain from transmitting the GC-PSCCH and may continue to monitor the odd slots. When no further GC-PSCCHs indicative of the first highest priority class are detected, the WTRU may initiate its own GC-PSCCH transmission.

FIG. 8B illustrates an example interlaced pre-emption prioritization scheme. The GC-PSSCH may be used to assign a priority class (e.g., a highest priority class) with a number of resources (e.g., a higher number of resources), such as all slots or mini-slots. A WTRU with data belonging to the second highest priority traffic may be assigned a subset of the slots/min-slots that were assigned to the higher priority data. For example, the WTRU with data belonging to the second highest priority traffic may be assigned one or more (e.g., all) even slots. WTRUs with data having lower priorities may be assigned a further subset of slots/mini-slots that were assigned to the WTRU with data having the second higher priority and so on. In mini-slot based monitoring, a modified GC-PSSCH may be used that is scheduled on a mini-slot granularity.

A pre-emption indication (e.g., via a SOS or RFI signal) may be used for prioritized pre-emption. A subset of sequences may be assigned to indicate pre-emption for the highest priority data. Another subset of sequences may be assigned to indicate pre-emption for the second highest priority data and so on. A resource location (e.g., even slots) may be assigned for a SOS or RFI signal for the highest priority traffic and another resource location (e.g., odd slots) may be assigned for a SOS or RFI signal for the second highest priority traffic and so on.

FIG. 9 illustrates an example for a receiving WTRU to alert a transmitting WTRU of a pre-emption signal, such as a SOS or RFI signal. The transmitting WTRU may not be able to switch from transmission to reception and back to transmission without a gap period to listen for the GC-PSSCH and/or the SOS or RFI signal. As such, the WTRU may refrain from transmitting within the resources reserved for the GC-PSSCH of the receiving WTRU. The receiving WTRU may decode information (e.g., information in the GC-PSSCH) in this reserved resource, e.g., in addition to the other information. The decoding may be done by the same receiver in the receiving WTRU or by a separate companion receiver (e.g., a separate low complexity companion receiver), which may be dedicated for this purpose. The signal decoding may be based on a low complexity receiver. The signal decoding may be performed based on a correlation (e.g., a simple correlation) or by energy detection. If the receiving WTRU receives a SOS or RFI signal within the reserved resource, the receiving WTRU may modify its behavior and/or perform other mechanisms (e.g., move to a pre-determined action or expect additional information in a specifically reserved future resource).

A receiving WTRU may decode the preemption and/or SOS/RFI signal. If the SOS information is in the same resource or the SOS action is immediate, for example, the WTRU may stop decoding data from a transmitting WTRU and may start the SOS action, such as decoding the SOS signal and/or performing the SOS request. The receiving WRTU may send an SOS received signal to the transmitting WRTU for further action. If the SOS information is in a different resource (e.g., later resource) or the SOS action is not immediate, for example, the receiving WRTU may continue decoding the data from the transmitting WRTU. The receiving WRTU may send an ACK/NAK to the transmitting WRTU and an associated SOS signal for further action and perform the SOS action. The transmitting WRTU on receiving the SOS signal (with or without the ACK/NAK) may perform the SOS action.

If the transmitting WTRU is not able to decode the SOS or RFI signal (e.g., due to its inability to quickly switch between transmit and receive), the receiving WTRU may transmit or relay the SOS or RFI signal to the transmitting WTRU during the reserved ACK period of the transmitting WTRU or additional period (e.g., of the transmitting WTRU) reserved to receive the SOS or RFI signals. The receiving WTRU may transmit the SOS or RFI signal with (e.g., in addition to) and/or without an ACK.

A WTRU that has received a broadcast pre-emption message intended for the network (e.g., the entire network), may re-broadcast/relay the preemption message on the same or different resources to enable propagation of the pre-emption message through the network. The re-broadcasting/relaying the preemption message may reduce or minimize any delays associated with delivering a number (e.g., a large number) of pre-emption messages to WTRUs, which may be part of a group or platoon. If the same resources are used, the same packet may be sent to enable combination of the message at the receiving WTRUs. If different resources are used, the information may be encoded differently.

A relay WTRU may send preemption information received from a source (e.g., network or source WTRU) to a target WTRU (e.g., by performing one or more of the features illustrated in FIG. 10).

A target WTRU may delegate (e.g., explicitly or implicitly) the act of listening for/to a preemption message(s) from a network or a source WTRU to a relay WTRU. For example, the target WTRU may delegate listening to the preemption message(s) to the relay WTRU when the target WTRU is unable to listen the preemption message(s). The target WTRU may determine that the target WTRU is not be able to listen to a BPM message, e.g., due to half-duplex constraints or capabilities. The target WTRU may determine that the target WTRU is far (e.g., too far) from a possible BPM transmitter to reliably receive the transmission. For example, the target WTRU may be at the edge of a platoon of vehicles with the platoon lead far away. On the reception of a message meant for the target WTRU (e.g., a BPM), the relay WTRU may send the message (e.g., the BPM in a BRM, information associated with the BPM, etc.) to the target WTRU, e.g., at an appropriate time. For example, the relay WTRU may send the preemption message to the target WTRU at the end of the transmission, at pre-configured times (e.g., in a TDD system, during symbols where the direction switches from outward to inward or inward to outward), or preemption information in the BRM (e.g., the WTRU may expect/receive a new set of instructions at a future time (t); and/or the WTRU may perform a set of actions at a future time (t)).

A WTRU (e.g., a source WTRU) may send a message, such as a broadcast preemption message (BPM).

A BPM may be a message sent by a source WTRU to a target WTRU to interrupt and/or modify current or future action(s)/behavior of the target WTRU.

A BPM may be directed at a target WTRU or a set of target WTRUs. The BPM may modify behavior of the target WTRU(s), e.g., at a target time (t). For example, the BPM may configure the target WTRU(s) to perform one or more of the following: to stop a current transmission; and/or to stop the action that the target WTRU(s) are taking at a time (t) and/or respond to an action.

The BPM may be directed at the target WTRU or a group of target WTRUs to stop a transmission (e.g., the current transmission as an example).

In examples, the target WTRU or the group of target WTRUs may stop the current transmission, which may allow for a transmission from another WTRU. For example, the transmission from another WTRU may have higher priority traffic.

In examples, the target WTRU or the group of target WTRUs may stop the current transmission due to a resource preemption from another WTRU. The other WTRU may take the resource from the current WTRU.

In examples, the target WTRU or the group of target WTRUs may stop the current transmission for a transmission from the same WTRU(s). For example, the transmission from the same WTRU(s) may be or may include traffic that comes from a logical channel (LCH) with a higher priority.

The BPM may be directed at the target WTRU or the group of target WTRUs (e.g., a subset of the WTRUs in the network). The BPM may indicate to stop the action that the target WTRU(s) may be taking at a specific time (t) and/or respond to an action.

In examples, the target WTRU(s) may respond to a vehicular emergency action, e.g., such as a braking procedure or an avoidance procedure.

In examples, the target WTRU(s) may respond to the action and monitor a stand-alone dedicated channel (SDCCH) for a future message.

The target WTRU may be or may include WTRU1 or WTRU set 1 and may be used interchangeably.

The source WTRU that sends the BPM (e.g., the original BPM) may be or may include WTRU3. The source WTRU (e.g., WTRU3) may be the WTRU that requests for the preemption or action. The source WTRU may be or may include WTRU3 and may be used interchangeably.

A WTRU (e.g., a relay WTRU and/or a source WTRU) may send message, such as a broadcast relay message (BRM) or a relay message, to the target WTRU.

A BRM may be a message sent by a relay WTRU to a target WTRU. For example, the BRM may relay a message, such as a BPM, from a source WTRU to a target WTRU. For example, as described herein, the message from the source WTRU may be or may include an indication to interrupt the current action of the target WTRU.

The BRM may be directed at the target WTRU or the set of target WTRUs to modify the behavior(s) of the target WTRU(s), e.g., at a target time (t).

The BRM may be a relay (e.g., direct relay) of the BPM (e.g., without modifications).

The BRM may be a message that includes information derived from the BPM.

A relay WTRU or a set of relay WTRUs may be or may include WTRU2 or WTRU set 2, respectively, and may be used interchangeably.

The BRM may include one or more of the following: preemption information to indicate that the WTRU (e.g., the target WTRU) may stop transmission, e.g., on a specific resource or set of resources to allow another WTRU to transmit; preemption information to indicate that the WTRU (e.g., the target WTRU) may stop transmission and/or expect a new set of instructions or specific actions; and/or signaling to enable a relay message stopping criterion, for example to prevent relaying (e.g., of the BRM/BPM) that exceeds a threshold. If the BRM includes the preemption information, the BRM may include information on where (e.g., rescheduling) the relay WTRU may retransmit the information (e.g., partial or all of the information), e.g., if the information failed to transmit during stoppage.

The BRM may include preemption information to indicate that the WTRU (e.g., the target WTRU) may stop transmission and/or expect a new set of instructions or specific actions. The preemption information may indicate one or more of the following: the WTRU (e.g., the target WTRU) may expect a new set of instructions, e.g., at a future time (t); and/or the WTRU (e.g., the target WTRU) may perform a set of actions, e.g., at a future time (t).

The BRM may include signaling to enable a relay message stopping criterion and prevent relaying (e.g., of the BRM/BPM) that exceeds a threshold. The WTRU (e.g., the relay WTRU) may stop relaying of the message directed to the target WTRU (e.g., BPM and/or BRM) based on one or more of the following: based on how many times the BRM has been relayed; based on when the BRM was sent; based on space and/or range between the source (e.g., the source WTRU) and the destination (e.g., the target WTRU); and/or based on the priority of the BPM/BRM received. The relay WTRU may use the relay messages stopping criterion described herein to determine whether to relay the BPM (e.g., or stop relaying the BPM to prevent relaying of the BPM exceeding a threshold). For example, the relay WTRU may determines whether the relaying of the BPM exceeds a preconfigured relay counter threshold that the BPM has been relayed, whether the relaying of the BPM exceeds a preconfigured time threshold of when the BPM was first sent from the source WTRU, and/or whether the range between the source and the destination exceeds a preconfigured distance threshold. If the relay WTRU determines that the relay message stopping criterion have been exceeded (e.g., exceeding the preconfigured relay counter threshold, the preconfigured time threshold, and/or the preconfigured distance threshold), the relay WTRU may stop relaying the BPM and prevent relaying of the BPM exceeding a threshold.

The source WTRU may transmit a BPM to the target WTRU. The relay WTRU may relay the BPM in, or as part of, a BRM to the target WTRU. In an example where there are multiple relay WTRUs, the BPM may be transmitted from the source WTRU and received by a first relay WTRU. The BPM may be relayed in, or as part of, a BRM sent by the first relay WTRU. The BRM may be received by a second relay WTRU that may relay the BRM to the target WTRU. Stopping criterion associated with the BRM may be used, e.g., to prevent relaying (e.g., relaying the BRM including the BPM) that exceeds a threshold. For example, a counter associated with the BRM (e.g., indicating the number of times the BPM has been relayed) may be incremented accordingly. The target WTRU may receive the BRM from the second relay WTRU and/or the first relay WTRU.

The relay WTRU may stop relaying the BRM based on how many times the BRM has been relayed and whether the number of times that the BRM has been relayed exceeds a preconfigured relay counter threshold. In examples, the BRM may include a counter that may be used to determine if the BRM may be relayed or may be stopped. The counter may be updated when (e.g., every time) the BRM is relayed. WTRU2 may stop relaying if the counter reaches or exceeds a preconfigured relay counter threshold (e.g., that is fixed or configurable relay counter threshold). For example, the counter may indicate about the BRM relay process. The WTRU may identify the proper BRM relay process, for example, based on an explicit BRM identifier (e.g., included in the BRM), or based on the (e.g., full) content of the BRM.

Relaying of the BRM may be stopped based on when the BRM was sent. In examples, the BRM may include a time stamp (e.g., or a field derived from or indicating a time stamp). The time stamp may indicate timing (e.g., an absolute or a relative timing), e.g., that indicates a time that the BRM was first sent from the source WTRU and/or when the BRM was first relayed. In examples, the time stamp may indicate an expiration time after which the BRM may not be relayed. In examples, the time stamp may indicate the actual time(s) that the BRM was relayed in the past. The current relay WTRU may use this information to decide if the BRM may be further relayed. In examples, the time stamp(s) may be updated when the BPM/BRM is relayed (e.g., each time the BPM/BRM is relayed). In examples, the time stamp may not be updated each time the BPM/BRM is relayed. For example, if the time stamp is not updated, the relay WTRU may stop relaying based on the difference between the current time and the time stamp (e.g., the time it was transmitted) being greater than a threshold (e.g., a preconfigured time threshold).

Relaying of the BRM may be stopped based on space and/or range between the source and the destination. In examples, the space and/or range between the source and the destination may be based on a received SNR value. In examples, the space and/or range between the source and the destination may be based on location information (e.g., sent explicitly). In examples, the space and/or range between the source and the destination may be based on location information estimated by the relay WTRU. In examples, the BRM message may carry the position of the source. The relaying WTRU may determine whether to relay the BRM based on the calculated space and/or range between the source and the destination WTRU and a threshold (e.g., using the position of the source in the BRM message). The threshold may be or may include a preconfigured distance threshold.

Relaying of the BRM may be stopped based on the priority of the BPM/BRM received.

A WTRU (e.g., a target WTRU) may perform a broadcast preemption action based on the BPM and/or the BRM.

A broadcast preemption action may be an action taken by a target WTRU (e.g., or a group of target WTRUs) in response to reception of a BPM or a BRM. For example, the broadcast preemption action may include stopping a current transmission, e.g., for a transmission from another WTRU. The target WTRU(s) may stop the current action, e.g., for another action by the WTRU (e.g., indicated by the source WTRU) as described herein.

A relay WTRU may be configured. A relay WTRU (e.g., WTRU2) or a set of relay WTRUs (e.g., WTRU set 2) may be configured based on implicit configuration and/or explicit configuration. The implicit and/or explicit configuration may be or may include an implicit and/or explicit indication from the target WTRU (e.g., WTRU1) or from a central node.

The relay WTRU (e.g., WTRU2) or the set of relay WTRUs (e.g., WTRU set 2) may be configured as a relay WTRU for the target WTRU (e.g., WTRU1) based on implicit configuration (e.g., receiving a data transmission from the WTRU1). For example, WTRU2 or WTRU set 2 may set (e.g., implicitly set) as the relay WTRU for WTRU1, e.g., based on the implicit configuration.

For example, the relay WTRU (e.g., WTRU2) or the set of relay WTRUs (e.g., WTRU set 2) may receive information (e.g., a data transmission) from another WTRU (e.g., a target WTRU or WTRU1). If WTRU2 or WTRU set 2 receives information (e.g., a data transmission) from WTRU1, WTRU2 or WTRU set 2 may be configured (e.g., implicitly configured) as a relay WTRU for WTRU1. As the relay WTRU for WTRU1, WTRU2 or WTRU set 2 may monitor BPM transmission resources on behalf of WTRU1 (e.g., as illustrated in FIG. 9). For example, WTRU2 or WTRU set 2 may monitor BPM transmission resources on behalf of WTRU1 based on receiving the implicit and/or explicit configuration (e.g., indication) from the target WTRU or WTRU1.

The relay WTRU (e.g., WTRU2) or the set of relay WTRUs (e.g., WTRU set 2) may be configured based on an explicit configuration (e.g., an explicit indication). For example, WTRU2 or WTRU set 2 may be configured (e.g., explicitly configured) by a network or by the target WTRU (e.g., WTRU1).

In examples, the relay WTRU (e.g., WTRU2) or the set of relay WTRUs (e.g., WTRU set 2) may be configured by the network to serve as relay WTRUs to other WTRUs in the network (e.g., the entire network). The configuration may be static, semi-static, or dynamic. The static or semi-statically configuration may use an RRC configuration or MAC-CE signaling. The dynamic configuration may use L1 signaling.

In examples, the relay WTRU (e.g., WTRU2) or the set of relay WTRUs (e.g., WTRU set 2) may be configured (e.g., explicitly configured) by the target WTRU (e.g., WTRU1) or set of target WTRUs (e.g., WTRU set 1) to serve as relay WTRUs to the target set. The configuration may be static, semi-static, or dynamic.

A target WTRU (e.g., WTRU1) may send an explicit indication, such as a preemption delegation message, to a relay WTRU (e.g., WTRU2). The target WTRU may delegate monitoring for the BPM to the relay WTRU by sending the explicit indication, such as the preemption delegation message.

A preemption delegation message may be or may include a message from the target WTRU (e.g., WTRU1) to the relay WTRU (e.g., WTRU2). The preemption delegation message may configure (e.g., designate) WTRU2 as a relay WTRU for WTRU1. By sending the preemption delegation message, WTRU1 may delegate the responsibility of listening to/monitoring for the BPM(s) to the relay WTRU (e.g., WTRU2). The relay WTRU (e.g., WTRU2) may send the BRMs (e.g., the BPMs included in the BRMs as described herein) to the target WTRU (e.g., WTRU1) from a source WTRU (e.g., WTRU3). For example, the relay WTRU may receive a message from the source WTRU. The message from the source WTRU may be directed to the target WTRU. For example, the message from the source WTRU may be or may include a preemption message to the target WTRU. If the relay WTRU determines that the message from the source WTRU is directed to the WTRU, the relay WTRU may relay the message from the source WTRU in a relay message, such as a BRM. The relay message from the relay WTRU may be relayed directly to the target WTRU. The relay message from the relay WTRU may be relayed via one or more other relay WTRUs and may be relayed to the target WTRU, e.g., if the relay criterion described herein has been satisfied. The target WTRU (e.g., WTRU1) may transmit a preemption delegation message to the relay WTRU (e.g., WTRU2) or the set of relay WTRU (e.g., relay WTRU set 2). At predefined monitoring occasions, WTRU1 may listen for a BPM from a source WTRU (e.g., WTRU3) or a BRM from the relay WTRU (e.g., WTRU2). On reception of the BPM/BRM, WTRU1 may modify the behavior, e.g., to account for the received message. For example, WTRU1 may stop current transmission or take preemptive action according to the BPM/BRM.

The preemption delegation message may indicate, for example, the set of resources (e.g., time and/or frequency) in which the target WTRU (e.g., WTRU1) may not be able to receive a broadcast preemption message. The preemption delegation message may indicate the set of resources in which the target WTRU (e.g., WTRU1) is expected to receive a BPM/BRM. The relay WTRU (e.g., WTRU2) may use the indication from the preemption delegation message (e.g., the set of resources that the target WTRU is unable to receive the BPM/BRM or is able to receive the BPM/BRM) to monitor for the BPM intended for the target WTRU (e.g., WTRU1).

The delegation message signaling may be implicit. For example, if WTRU1 is transmitting (e.g., a data transmission or control information transmission) to WTRU2, WTRU2 may know (e.g., implicitly know) what set of resources WTRU1 is using for transmission. For example, based on receiving the data transmission from WTRU1, WTRU2 may determine that WTRU1 is unable to monitor/receive a message, such as a BPM, from the source WTRU. WTRU2 may be configured to monitor WTRU1 control channel and may determine the set of resources where WTRU1 is transmitting and may be unable to receive the BPM/BRM.

The delegation message signaling may be explicit. For example, if WTRU1 is not transmitting information to WTRU2 or WTRU2 is unable to determine the occasions where WTRU1 is unable to receive the BPM/BRM, WTRU1 may transmit an explicit preemption delegation message to WTRU2. WTRU2 may relay the BPMs to WTRU1 using a relay message, such as a BRM.

The preemption delegation message may include one or more of the following: a duration parameter; a period and/or duration for semi-persistent or periodic transmission by a target WTRU; and/or a set of preemption timing parameters.

The preemption delegation message may include a duration parameter. A duration parameter may indicate the length of time for which the preemption delegation is valid. The relay WTRU may listen for the BPM(s) and may relay the BPM(s), e.g., via BRMs as described herein, for the indicated duration.

The preemption delegation message may indicate (e.g., or define) a period and/or a duration for semi-persistent or periodic transmission by the target WTRU (e.g., WTRU1).

The preemption delegation message may include a set of preemption timing parameters. The set of preemption timing parameters may indicate when the relay WTRU (e.g., WTRU2) may transmit the message to the target WTRU (e.g., WTRU1). The relay WTRU (e.g., WTRU2) may determine occasions/resources to use for transmission, e.g., of BRM(s) to the target WTRU (e.g., WTRU1), e.g., based on the received timing parameters.

The preemption delegation message may be transmitted to the WTRU/WTRU set by dynamic signaling, e.g., WTRU specific or group sidelink control channel.

The preemption delegation message may use MAC-CE or RRC signaling.

The relay WTRU (e.g., WTRU 2) may transmit a BRM, e.g., relaying the BPM or information associated with the BPM to a target WTRU (e.g., WTRU 1).

The relay WTRU (e.g., WTRU2) may transmit a BRM to the target WTRU in one or more of the following cases: if the relay WTRU receives a BPM intended for the target WTRU; if the target WTRU indicates to the relay WTRU to monitor a message, such as a BPM, directed to the target WTRU; and/or by detecting (e.g., autonomously detecting) the need for the target WTRU to receive the BPM, e.g., based on the target WTRU control signaling.

The relay WTRU may detect the need for the target WTRU to receive the BPM based on receiving a transmission (e.g., a data transmission acts as an implicit preemption delegation message) from WTRU1. The transmission from WTRU1 may include an indication about a duration (e.g., length) of the transmission from WTRU1 to WTRU1. WTRU2 may know (e.g., automatically know) that WTRU1 is unavailable (e.g., out of commission for the duration) and may monitor the message (e.g., the BPM) directed to WTRU1.

The relay WTRU may detect the need for the target WTRU to receive the BPM based on monitoring for a PDCCH from a central node (e.g., a gNB). WTRU2 may identify that WTRU1 is scheduled to transmit for a duration, e.g., based on the PDCCH. WTRU2 may know (e.g., automatically know) that WTRU1 is unavailable (e.g., out of commission for this duration) and may monitor the message (e.g., the BPM) directed to WTRU1. The WTRUs (e.g., the target WTRUs) may need to send the C-RNTIs (e.g., or IDs) to the relay WTRU, and the relay WTRU may monitor the PDCCHs, e.g., based on the C-RNTIs (e.g., or IDs).

The relay WTRU (e.g., WTRU2) may transmit a BRM to the target WTRU (e.g., WTRU1) if the relay WTRU receives a BPM (e.g., every time the relay WTRU receives the BPM). If the relay WTRU sends a BRM each time the relay WTRU receives a BPM, the probability that the target WTRU (e.g., WTRU1) receives the messages may increase.

In examples, the timing (e.g., the exact timing) of the BRM may be fixed or may be configured based on the knowledge of WTRU2 to the state of WTRU1. For example, WTRU2 may know that WTRU1 may have switched from transmission to reception mode (e.g., send the BRM when WTRU1 is in reception mode).

In examples, if WTRU1 is transmitting, WTRU2 may monitor the channel, e.g., to identify when WTRU1 stops transmitting.

In examples, WTRU1 may indicate the length/duration of the transmission. WTRU2 may transmit a message, such as a BRM or a BPM directed to WTRU1, to WTRU1, e.g., at the end of the transmission.

In examples, WTRU1 may indicate preemption listening periods to WTRU2. The listening periods may be statically or dynamically indicated. WTRU2 may transmit the BRM to WTRU1, e.g., during the indicated preemption listening periods (e.g., during any of the indicated periods).

The relay WTRU (e.g., WTRU2) may transmit a BRM to the target WTRU (e.g., WTRU1) based on the target WTRU (e.g., WTRU1) indicating that the relay WTRU (e.g., WTRU2) is to monitor a message directed to the target WTRU, such as the BPM messages to the target WTRU. For example, the target WTRU (e.g., WTRU1) may indicate to the relay WTRU to monitor the message directed to the target WTRU, such as the BPM, when the target WTRU is transmitting or when the target WTRU is busy. If the target WTRU indicates to monitor the message, such as the BPM, to the relay WTRU (e.g., WTRU2), WTRU1 may delegate listening for the BPM to WTRU2, e.g., using a preemption delegation message as described herein. The target WTRU (e.g., WTRU1) may include information (e.g., in the indication) to the relay WTRU when to transmit the BRM (e.g., as shown in FIG. 11). For example, the target WTRU may indicate when it is available to receive the BRM from the relay WTRU.

The relay WTRU (e.g., WTRU2) may transmit the message directed to the target WTRU (e.g., WTRU1), via a BRM for example, by detecting (e.g., autonomously detecting) the need for WTRU1 to receive the BPM information. The relay WTRU may detect (e.g., autonomously detect) the need for WTRU1 to receive the BPM information based on WTRU1 control signaling.

The target WTRU (e.g., WTRU1) may transmit the preemption delegation message to the relay WTRU based on a configuration, such as a timing configuration.

The target WTRU (e.g., WTRU1) may be configured to transmit a preemption delegation message based on one or more of the following: capability to listen to a BPM message; and/or the distance of the target WTRU to a BPM transmitter.

The target WTRU may determine that the target WTRU may not be able to listen to a BPM message, e.g., due to half-duplex constraints or capabilities.

The target WTRU may determine that the target WTRU is far (e.g., too far) from a possible BPM transmitter to reliably receive the transmission, such as the BPM. For example, the target WTRU may be at the edge of a platoon of vehicles with the platoon lead far away.

FIG. 10 illustrates action(s) associated with preemption. For example, as shown in FIG. 10, a relay WTRU (e.g., WTRU2) may alert a target WTRU (e.g., WTRU1) based on receiving a BPM (e.g., received from a source WTRU, such as WTRU3). For example, the relay WTRU may alert the target WTRU by relaying the received BPM directed to the target WTRU, e.g., via a BRM as illustrated in FIG. 10. The relay WTRU (e.g., WTRU2) may receive a data transmission (e.g., acts as an implicit preemption delegation message) from the target WTRU (e.g., WTRU1) and may transmit a BRM to the target WTRU (e.g., WTRU1) if the BPM is received from the source WTRU (e.g., WTRU3), e.g., during such time. For example, the BPM may be directed/intended for WTRU1. The preemption delegation message may be implicit, e.g., based on WTRU2 receiving data from WTRU1 during the time WTRU1 is transmitting, for example as illustrated in FIG. 10.

The target WTRU (e.g., WTRU1) may transmit data and may be unable to receive a message directed to the target WTRU, such as the BPM. As shown in FIG. 10, the target WTRU (e.g., WTRU1) may transmit data to the relay WTRU (e.g., WTRU2). WTRU1 may indicate the delegation configuration, such as BPM delegation, to WTRU2 and may delegate listening to the BPM to WTRU2 (e.g., on behalf of WTRU1). If the resources for the data transmission and the preemption message overlap, WTRU1 may rate match around the preemption resources or puncture the data in the preemption resources.

WTRU1 may monitor the preemption resource for information from WTRU2. WTRU1 monitoring the preemption resource for the information from WTRU 2 may be indicated as preemption resource 1 (PR1), e.g., as shown in FIGS. 10 and 11.

If there is no information in the PR1 (e.g., no BRM received by WTRU1), WTRU1 may receive an ACK/NAK and may end the transmit/receive mechanism, as shown in FIG. 10.

If the PR1 is received after the transmission (e.g., data transmission from WTRU1 to WTRU2), WTRU2 may send and WTRU1 may receive an ACK/NAK with the BRM, as shown in FIG. 10.

If the BPM is received by WTRU2 at a time after a configured time (e.g., close to the end of the transmission), WTRU2 may send and WTRU1 may receive an ACK/NAK with the BRM, as shown in FIG. 10. The BRM may be or may include the BPM directed to WTRU1.

If the BPM received in WTRU2 prompts an action that is not immediate, WTRU2 may send and WTRU1 may receive an ACK/NAK with the BRM, as shown in FIG. 10. The BRM may be or may include the BPM directed to WTRU1.

If one or more preemption resources are available in the PR1 during the transmission and the BPM is received in WTRU2 at a time before a configured time (e.g., close to the end of the transmission), WTRU2 may send and WTRU1 may receive the BRM (e.g., without ACK/NAK). WTRU1 may respond to the BRM action. WTRU1 may truncate transmitting the data.

Preemption features for the relay WTRU (e.g., WTRU2) may be described herein. One or more of the following may apply.

As shown in FIG. 10, WTRU1 and WTRU2 may know about configuration (e.g., a PR1 and/or a PR2). A PR1 may indicate the resources in which WTRU1 may receive the BRM. A PR2 may indicate the resources in which WTRU2 may use to receive the BPM meant for WTRU1.

WTRU2 may need to know about the PR2, e.g., to monitor, such as when to monitor, for the BPM. WTRU2 may need to know about PR1, e.g., to transmit, such as when to transmit to WTRU1. WTRU1 may need to know about the PR1, e.g., to delegate, such as when to delegate, the monitoring the BPM to WTRU2. WTRU may need to know about the PR2, e.g., to receive, such as when to receive, the BPM from WTRU2. The configuration may be sent separately to WTRU1 and WTRU2. The configuration may be sent simultaneously (e.g., in a GC-PSSCH).

As shown in FIG. 10, WTRU2 may receive the BRM configuration from WTRU1. A PR1 may indicate the resources in which WTRU1 may receive the BRM. A PR2 may indicate the resources in which WTRU2 may use to receive the BPM meant for WTRU1. For example, the BPM meant for WTRU1 may include network preemption signaling and/or WTRU1-specific preemption signaling. In examples, the PR1 may be identical to the PR2. For example, the relay WTRU may have the same resource to receive the BPM and to transmit the BRM. In examples, the PR1 may differ from the PR2. For example, the relay WTRU may use different resources to receive the BPM and to transmit the BRM (e.g., and not miss any messages).

WTRU2 may receive a data transmission (e.g., acts as an implicit preemption indication).

As shown in FIG. 10, WTRU2 may receive data from WTRU1, which may be an implicit preemption delegation of WTRU1 to WTRU2. As described herein, the implicit preemption delegation of WTRU 1 may be or may include data transmission from WTRU1 to WTRU2.

WTRU2 may monitor the PR2. For example, WTRU2 may monitor whether the BPM exists in the PR2.

If the BPM does not exist (e.g., is not received) in the PR2, WTRU2 may decode data from WTRU1 and may send ACK/NAK to WTRU1.

If the BPM exists (e.g., received) in the PR2, WTRU2 may decode the BPM and may create a BRM.

If the PR1 is received after the transmission (e.g., the transmission from WTRU1), WTRU2 may decode the data (e.g., data transmission from WTRU1) and may send an ACK/NAK to WTRU1 with the BRM. For example, WTRU2 may wait for the data transmission from WTRU1 to finish, e.g., before sending the BRMs.

If the BPM in the PR2 is received at a time after a configured time (e.g., close to the end of the transmission) and if the PR1 is received after the transmission, WTRU2 may decode the data (e.g., data transmission from WTRU1) and may send an ACK/NAK with the BRM (e.g., a SOS message) to WTRU1. For example, WTRU2 may skip sending the BPM in the BRM to WTRU1 (e.g., and/or preempting) if the BPM in the PR2 is received at a time after a configured time (e.g., close to the end of the transmission) and if the PR1 is received after the transmission.

If the BPM in the PR2 prompts an action that is not immediate, WTRU2 may decode the data (e.g., data transmission from WTRU1) and may send an ACK/NAK with the BRM (e.g., an SOS message) to WTRU1.

If the PR1 provides opportunities for WTRU2 to transmit a relay message to WTRU1 (e.g., before the end of the message) and the BPM is received before a configured time (e.g., close to the end of the transmission), WTRU2 may transmit the BRM to WTRU1. WTRU2 may stop decoding the signal (e.g., data transmission) received from WTRU1.

FIG. 11 illustrates an example relay preemption mechanism. As shown in FIG. 11, a receiver WTRU (e.g., WTRU4) may receive data from a target WTRU (e.g., WTRU1). A relay WTRU (e.g., WTRU2) may be a dedicated relay WTRU and may transmit a BRM to the target WTRU (e.g., WTRU1) if a BPM is received from a source WTRU (e.g., WTRU3).

Target WTRU (e.g., WTRU1) may delegate monitoring and/or receiving a message, such as a BPM, from a source WTRU to other WTRUs, such as the relay WTRU (e.g., WTRU2).

As shown in FIG. 11, WTRU1 may indicate the BRM configuration to WTRU2 (e.g., via relay preemption configuration) and may delegate listening to the BPM from WTRU3 to WTRU2 (e.g., via relay preemption delegation).

Preemption resource 1 (PR1) may indicate the resources that WTRU1 may use to receive the BRM.

Preemption resource 2 (PR2) may indicate the resources that WTRU2 may use to receive the BPM meant for WTRU1. For example, the BPM meant for WTRU1 may include network preemption signaling and/or WTRU-specific preemption signaling.

In examples, the PR1 may be identical to the PR2. In examples, the PR1 may be different from the PR2.

The BRM configuration from WTRU1 to WTRU2 may include the duration of the delegation to WTRU 1.

WTRU1 may transmit information, such as data, to WTRU4.

WTRU1 may monitor the preemption resource for information from WTRU2. For TDD transmission, WTRU1 may stop transmission to WTRU4 during the monitoring period. For FDD transmission, WTRU1 may continue transmission (e.g., to WTRU4) during the monitoring period. If the BRM is received in the PR1, WTRU1 may stop the transmission to WTRU4.

WTRU1 may perform the preemptive action (e.g., according to the BRM).

The preemption mechanism for the relay WTRU (e.g., WTRU2) may be described herein.

WTRU2 may receive the BRM configuration from WTRU1 and may accept listening to the BPM from WTRU3, e.g., on behalf of WTRU2.

The PR1 may indicate the resources that WTRU1 may receive the BRM.

The PR2 may indicate the resources that WTRU2 may use to receive the BPM meant for WTRU1 (e.g., general network preemption signaling and/or WTRU1-specific preemption signaling).

In examples, the PR1 may be identical to the PR2. In examples, the PR1 may be different from the PR2.

The BRM configuration from WTRU1 may include the duration of the delegation to WTRU1.

WTRU2 may monitor preemption resources for general signaling to WTRU1 (e.g., or a general network preemption signaling). Such resources may be the PR2. If WTRU2 receives a BPM from WTRU3, WTRU2 may wait for the next PR1 resource and may relay the information to WTRU1.

Hierarchical control information may be provided. A part of the control information that is common to a group of WTRUs and/or to a group of intended receiving WTRUs may be separated and transmitted as sidelink control information (SCI), which may reduce signaling overhead (e.g., for unicast control information). As such, the WTRU may transmit one or more types of SCI, such as broadcast SCI, unicast SCI, and/or groupcast SCI. The WTRU may transmit the broadcast SCI to schedule broadcast sidelink data transmission from the WTRU and/or to transmit part of the control information that is common among one or more (e.g., all) unicast transmissions from the WTRU.

Other WTRUs (e.g., unintended WTRUs) may detect the presence of the broadcast SCI and decode the content. Depending on the type of information in the broadcast SCI, the other WTRUs may infer one or more of the following: the attribute(s) of a unicast or groupcast data transmission, such as the MCS, the priority and/or latency identifier of the data, etc.; a capability or configuration of the transmitting WTRU, such as the MCS table, the number of HARQ processes that the transmitting WTRU is able to perform, etc.; and/or the presence of a PSCCH (and associated PSSCH) by performing detection of the demodulation reference signal (DMRS), which due to the nature of the broadcast SCI, may not be WTRU-specific DMRS.

The content of the broadcast SCI may include one or more of the following: a traffic identification/priority, which may be indicative of urgency, latency, reliability, etc.; a number of HARQ processes; an MCS table; a K-repetition value; a frequency hopping identifier; an SRS resource indicator; and/or a duration of an upcoming PSSCH or a duration of the set of PSSCH resources expected to be allocated by the same traffic identifier.

One or more attributes, such as the K-repetition value or the traffic/latency identifier, in the broadcast SCI may help other WTRUs to plan (e.g., better plan) for resource allocation. For example, by identifying a broadcast SCI and its associated PSCCH with the latency identifier (which may be associated with traffic priority), a transmitting WTRU may be able to avoid collisions on the PSSCH and/or help other WTRUs to look for other resources. The transmitting WTRU may attempt to check back after the identified duration.

The content of the unicast SCI may include one or more of the following: a HARQ process ID; an MCS; a K-repetition value; a frequency hopping identifier; a power control (e.g., Loop ID, P0-PUSCH Alpha, etc.); and/or an indication of transform (e.g., pre-determined) precoder of PSSCH.

A sidelink group common SCI (SL-GC-SCI) may be used for transmitting part of control information that is common among one or more (e.g., all) unicast transmissions from a WTRU to a group of (e.g., intended) receiving WTRUs (e.g., a group of WTRUs or roadside units, or a combination of them). The SL-GC-SCI may be transmitted on the GC-PSCCH, which may have a structure similar to or different from unicast PSCCH. In the GC-PSCCH, a CRC masked by an RNTI of the receiving group may be used for group identification. The identity of the transmitting WTRU for the GC-PSCCH may be indicated via the associated configured resources, via a header in its content (SL-GC-SCI) and/or via a CRC (e.g., an additional CRC) masked by the transmitting WTRU's RNTI. SL-GC-SCI transmitted by the GC-PSCCH may include information or parameters for one or more (e.g., all) unicast transmissions from the transmitting WTRU to the intended receiving group. The parameters may include one or more of the following: a number of HARQ processes; an MCS table and/or MCS; a K-repetition value; and/or a preemption indication for the data transmitted by the transmitting WTRU to the intended receiving group.

The resources for broadcast and unicast portions of SCI may be adjacent and may have the same or similar attributes.

The hierarchical properties (e.g., resource allocation and/or transmission properties) of the broadcast and unicast portions of SCI may be different. For example, the resource for broadcast SCI may be chosen from a set of resources designated for broadcast resources. The transmission attributes of the broadcast SCI may be chosen from a set (e.g., default set) and/or from a smaller set of choices, which may allow for blind detection (e.g., short and quick blind detection) at the receiving WTRUs. A broadcast SCI may include some of the transmission attributes of the associated unicast SCI, such as the MCS, the unicast SCI resource location, and the like. The unicast SCI may be from the same resources as the data/shared channel.

Collision avoidance, in ALL communication for example, may be provided. Collisions may result when a resource is accessed by more than one WTRU. The effect of collisions may be more pronounced in situations where low latency is desired. PSSCH transmissions may be longer than PSCCH transmissions. As such, the effect of collisions on the PSSCH may be more pronounced as compared to collisions on the PSCCH, though collisions on the PSCCH may result in the associated PSSCH to be missed. PSCCH may be transmitted with lower MCS, more redundant coding, and/or with duplication (e.g., due to its smaller size). This may increase the likelihood of detection, even in the case of collisions.

The PSCCH may be transmitted before PSSCH. For example, as noted above in connection with the description of FIG. 2, the PSCCH may be transmitted across the same frequency resources of the PSSCH and/or across a subset of the frequency resources of the PSSCH. As such, a collision avoidance scheme may be implemented by monitoring the PSCCH. For example, when attempting to use a given PSSCH resource, a WTRU may monitor the associated PSCCH to evaluate whether the PSSCH is free or not.

The PSCCH may be monitored via one or more of the following: a received signal strength indicator (RSSI) measurement over the PSCCH; a reference signal received power (RSRP) measurement (e.g., if non-WTRU-specific DMRS is used for PSCCH transmission); an RSRP measurement of the broadcast portion of the PSCCH transmission; and/or an RSRP measurement of the broadcast portion of the PSCCH and an RSSI measurement of unicast portion of the PSCCH.

When monitoring the PSCCH, the WTRU may compare one or more of the foregoing measurements with a threshold (e.g., respective threshold). If the measurement is larger than the threshold, the WTRU may skip transmission on one or more PSSCH resources (e.g., subsequent PSSCH resources). If the measurement is less than the threshold, the WTRU may transmit on one or more associated PSSCH resources (e.g., upcoming associated PSSCH resources). The threshold may be data and/or priority-dependent. The threshold may be calculated from a reference threshold and adjusted by the bandwidth of the PSCCH. The threshold may be adjusted (e.g., increased) if after a number of attempts (e.g., consecutive attempts) the WTRU fails to access the PSSCH resources.

In the case of a WTRU that is part of a platoon, one or more WTRUs (e.g., vehicles) that may be ahead in the platoon (e.g., have a higher priority) may be more likely to transmit TBs to the other WTRUs in the platoon. As such, the WTRU(s) may engage in more periodic transmissions than the other WTRUs. This situation may be leveraged during resource allocation to reduce the chance of collisions within the platoon.

A set of resources may be partitioned into sets (e.g., two or more sets). One set may be assigned to periodic transmission patterns. Another set may be assigned to aperiodic transmission patterns.

A partition (e.g., each partition) may have a set of contiguous resource blocks or a non-contiguous set of resource blocks. Partitioning the resources (e.g., bandwidth) into two or more sets may facilitate different reservation mechanisms. For example, periodic transmissions may be more reliable if a longer channel sensing is performed. As such, partitioning resources for periodic transmissions may avoid the presence of aperiodic transmissions. For aperiodic transmissions, the reservation mechanism may be faster by performing fast channel sensing. As such, aperiodic transmissions may be more reliable when resources are partitioned for such transmissions. Partitioning may reduce the (e.g., overall) collisions between WTRUs with periodic transmissions and WTRUs with aperiodic transmissions.

Resources may be partitioned for periodic and aperiodic transmissions. It will be appreciated that each PSSCH may have an associated PSCCH. The PSCCH may appear adjacent to a respective PSSCH. The PSCCH may appear adjacent in time (e.g., as illustrated in patterns 1A and 1B in FIG. 2) and/or adjacent in frequency (e.g., as illustrated in pattern 2 in FIG. 2).

The resource allocation for a partition may follow a different approach than another partition. For example, the resource allocation for periodic transmissions may be based on a sensing interval (e.g., a longer sensing interval), which may be different in the resource allocation for aperiodic transmissions. The WTRUs that choose a resource from the partition for periodic transmissions may share information with other WTRUs regarding the periodicity of their respective transmission, which may be the periodicity of transmitting in a PSSCH on that resource. The information may be carried in the PSCCH or in the broadcast portion of the associated PSCCH. The information may facilitate the sharing of allocated resources for periodic transmissions. For example, two or more WTRU may alternate use of a resource (e.g., a WTRU with periodic transmissions may not use a resource in every slot).

A WTRU that intends to send periodic transmissions may use a resource from the former set of resources. The selection of the resource from the set of resources may include one or more of the mechanisms described above and/or mechanisms that may use a long sensing period. The WTRUs with periodic transmissions may collide with one another, though the possibility of such collisions may be reduced since the number of WTRUs with periodic transmissions may be smaller than the total number of WTRUs in the platoon.

To facilitate a stable resource allocation during a duration (e.g., life) of a periodic transmission, the WTRU may select a resource from the first set of resources (e.g., for periodic transmissions) and continue to use the resource (e.g., same resource) for the duration (e.g., life) of the periodic traffic unless the WTRU identifies a collision. If the WTRU identifies a collision, the WTRU may select another resource (e.g., different resource) from the first set of resources.

A WTRU that intends to send aperiodic transmissions may use a resource from the second set of resources (e.g., assigned for aperiodic transmissions). The selection of the resource from the set of resources may include one or more of the mechanisms described above. The WTRUs with aperiodic transmissions may collide with one another, though the possibility of such collisions may be reduced since the number of WTRUs with aperiodic transmissions may be smaller than the total number of WTRUs in the platoon.

In the event where a WTRU with aperiodic transmissions determines that its transmission pattern matches that of a periodic transmission, the WTRU may choose a resource from the first set of resources.

The partition between the first set of resources (e.g., for periodic transmissions) and the second set of resources (e.g., for aperiodic transmissions) may be set as a default and/or may be pre-configured by a central node (e.g., a gNB), such as when WTRUs are within the central node's wireless coverage. One or more of the WTRUs may announce the partitioning to other WTRUs, such as those within the platoon. A WTRU that is ahead in the platoon and that engages in periodic traffic transmission may choose a partitioning scheme (e.g., from a set of choices) and may announce the selection to other WTRUs, such as those within the platoon.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A first wireless transmit/receive unit (WTRU) comprising:
a processor configured to:
determine, based on reception by the first WTRU of a data transmission from a second WTRU, that the second WTRU is unable to listen for a first message directed to the second WTRU;
monitor for the first message directed to the second WTRU based on the determination;
receive the first message directed to the second WTRU;
determine whether to relay the first message to the second WTRU in a second message; and
if the first WTRU determines to relay the first message to the second WTRU, transmit the second message to the second WTRU;
wherein the first message comprises a broadcast preemption message to the second WTRU to skip transmitting on a resource; and
wherein to determine whether to relay the first message to the second WTRU, the processor is configured to:
decode the first message, wherein the first message is transmitted from a source WTRU;
determine one or more of a number of times that the first message has been relayed, a time stamp indicative of when the first message has been transmitted from a third WTRU, or a distance between the third WTRU and the first WTRU; and
transmit the first message to the second WTRU in the second message, the second message comprising information about one or more of the number of times that the first message has been relayed, the time stamp associated with when the first message has been transmitted from the third WTRU, or the distance between the third WTRU and the first WTRU.

2. The first WTRU of claim 1, wherein the data transmission from the second WTRU comprises an implicit indication that the second WTRU is unable to listen for the first message directed to the second WTRU, and the processor is configured to:
determine when the second WTRU is transmitting and unable to listen for the first message based on monitoring a control channel associated with the second WTRU.

3. The first WTRU of claim 1, wherein the first message comprises a discovery message to the second WTRU.

4. The first WTRU of claim 1, wherein if the first message is not received, the processor is configured to decode the data transmission from the second WTRU.

5. The first WTRU of claim 1, wherein the first WTRU is a relay WTRU and the second WTRU is a target WTRU, and wherein the second message is a broadcast relay message.

6. A method performed by a first wireless transmit/receive unit (WTRU) comprising:
determining, based on reception by the first WTRU of a data transmission from a second WTRU, that the second WTRU is unable to listen for a first message directed to the second WTRU;
monitoring for the first message directed to the second WTRU based on the determination;
receiving the first message directed to the second WTRU;
determining whether to relay the first message to the second WTRU in a second message; and
if the first WTRU determines to relay the first message to the second WTRU, transmitting the second message to the second WTRU;
wherein the first message comprises a broadcast preemption message to the second WTRU to skip transmitting on a resource; and
wherein determining whether to relay the first message to the second WTRU comprises:
decoding the first message, wherein the first message is transmitted from a source WTRU;
determining one or more of a number of times that the first message has been relayed, a time stamp indicative of when the first message has been transmitted from a third WTRU, or a distance between the third WTRU and the first WTRU; and
transmitting the first message to the second WTRU in the second message, the second message comprising information about one or more of the number of times that the first message has been relayed, the time stamp associated with when the first message has been transmitted from the third WTRU, or the distance between the third WTRU and the first WTRU.

7. The method of claim 6, wherein the data transmission from the second WTRU comprises an implicit indication that the second WTRU is unable to listen for the first message directed to the second WTRU, and the method comprises:
determining when the second WTRU is transmitting and unable to listen for the first message based on monitoring a control channel associated with the second WTRU.

8. The method of claim 6, wherein the first message comprises a discovery message to the second WTRU.

9. The method of claim 6, wherein the method comprises:
if the first message is not received, decoding the data transmission from the second WTRU.

10. The method of claim 6, wherein the first WTRU is a relay WTRU and the second WTRU is a target WTRU, and wherein the second message is a broadcast relay message.

11. A first wireless transmit/receive unit (WTRU) comprising:
a processor configured to:
determine, based on reception of a data transmission from a second WTRU by the first WTRU, that the second WTRU is unable to listen for a first message directed to the second WTRU to obtain a first determination result;
monitor for the first message directed to the second WTRU based on the first determination result;
receive the first message directed to the second WTRU;
determine whether to relay the first message to the second WTRU in a second message; and
if the first WTRU determines to relay the first message to the second WTRU, transmit the second message to the second WTRU,
wherein, to determine whether to relay the first message to the second WTRU in the second message, the processor is configured to:
decode the first message, wherein the first message comprises a broadcast preemption message to the second WTRU to skip transmitting;
determine whether one or more of a number of times that the first message has been relayed exceeds a preconfigured relay counter threshold, a time stamp indicative of when the first message has been transmitted from a third WTRU exceeds a preconfigured time threshold, or a distance between the third WTRU and the first WTRU exceed a preconfigured distance threshold, to obtain a second determination result; and skip transmitting the second message to the second WTRU based on the second determination result.

12. The first WTRU of claim 11, wherein the data transmission from the second WTRU comprises an implicit indication that the second WTRU is unable to listen the first message directed to the second WTRU, and the processor is configured to:
   determine when the second WTRU is transmitting and unable to listen the first message based on monitoring a control channel associated with the second WTRU.

13. The first WTRU of claim 11, wherein the first message comprises a discovery message to the second WTRU.

14. The first WTRU of claim 11, wherein if the first message is not received, the processor is configured to decode the data transmission from the second WTRU.

15. The first WTRU of claim 11, wherein the first WTRU is a relay WTRU and the second WTRU is a target WTRU, and wherein the second message is a broadcast relay message.

16. A method performed by a first wireless transmit/receive unit (WTRU) comprising:
   determining, based on reception of a data transmission from a second WTRU by the first WTRU, that the second WTRU is unable to listen for a first message directed to the second WTRU;
   monitoring for the first message directed to the second WTRU based on the determination;
   receiving the first message directed to the second WTRU; and
   determining whether to relay the first message to the second WTRU in a second message; and
   if the first WTRU determines to relay the first message to the second WTRU, transmitting the second message to the second WTRU,
   wherein determining whether to relay the first message to the second WTRU in a second message comprises:
   decoding the first message, wherein the first message comprises a broadcast preemption message to the second WTRU to skip transmitting on a resource;
   determining whether one or more of a number of times that the first message has been relayed exceeds a preconfigured relay counter threshold, a time stamp indicative of when the first message has been transmitted from a third WTRU exceeds a preconfigured time threshold, or a distance between the third WTRU and the first WTRU exceed a preconfigured distance threshold; and
   skipping transmitting the second message to the second WTRU based on the determination.

17. The method of claim 16, wherein the data transmission from the second WTRU comprises an implicit indication that the second WTRU is unable to listen the first message directed to the second WTRU, and the method comprises:
   determining when the second WTRU is transmitting and unable to listen the first message based on monitoring a control channel associated with the second WTRU.

18. The method of claim 16, wherein the first message comprises a discovery message to the second WTRU.

19. The method of claim 16, wherein the method comprises:
   if the first message is not received, decoding the data transmission from the second WTRU.

20. The method of claim 16, wherein the first WTRU is a relay WTRU and the second WTRU is a target WTRU, and wherein the second message is a broadcast relay message.

* * * * *